(12) United States Patent
Matsuura et al.

(10) Patent No.: US 7,583,940 B2
(45) Date of Patent: Sep. 1, 2009

(54) TRANSMISSION CIRCUIT AND COMMUNICATION APPARATUS EMPLOYING THE SAME

(75) Inventors: Toru Matsuura, Osaka (JP); Shigeru Morimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 11/605,343

(22) Filed: Nov. 29, 2006

(65) Prior Publication Data
US 2007/0129032 A1 Jun. 7, 2007

(30) Foreign Application Priority Data
Dec. 1, 2005 (JP) .............................. 2005-348227

(51) Int. Cl.
H04B 1/02 (2006.01)
H04B 1/04 (2006.01)
(52) U.S. Cl. ..................... 455/108; 455/110; 455/127.1
(58) Field of Classification Search ................. 455/108, 455/110, 127.1, 114.1, 91, 114.2, 127.2, 455/126, 63.1, 67.13, 501, 570; 375/296, 375/300; 330/10, 136
See application file for complete search history.

(56) References Cited

U.S. PATENT DOCUMENTS

| | | | | |
|---|---|---|---|---|
| 4,947,455 | A * | 8/1990 | Swanson ................... | 455/127.1 |
| 5,745,526 | A * | 4/1998 | Kumm et al. ............... | 375/297 |
| 6,256,482 | B1 * | 7/2001 | Raab ......................... | 455/108 |
| 6,295,442 | B1 | 9/2001 | Camp, Jr. et al. | |
| 7,092,683 | B2 * | 8/2006 | Tanaka et al. .............. | 455/108 |
| 7,116,947 | B2 * | 10/2006 | Tanabe et al. .............. | 455/91 |
| 7,139,534 | B2 * | 11/2006 | Tanabe et al. .............. | 455/108 |
| 7,493,091 | B2 * | 2/2009 | Matsuura et al. ............ | 455/91 |
| 7,496,333 | B2 * | 2/2009 | Matsuura et al. ............ | 455/108 |
| 2006/0264186 | A1 * | 11/2006 | Akizuki et al. ............. | 455/108 |
| 2007/0009062 | A1 * | 1/2007 | Matsuura et al. ............ | 375/296 |

(Continued)

FOREIGN PATENT DOCUMENTS

WO 00/35080 6/2000

OTHER PUBLICATIONS

Nakakita, H et al., "60-Ghz-Band Ultracompact Transmitter for HDTV", Microwave Symposium Digest, 1997, IEEEMTT-S International Denver, CO, USA Jun. 8-13, 1997, New York, NY, USA, IEEE < US, vol. 3,Jun. 8, 1997, pp. 1143-1146, XP010228245.

Primary Examiner—Sonny Trinh
(74) Attorney, Agent, or Firm—Wenderoth, Lind & Ponack, L.L.P.

(57) ABSTRACT

A transmission circuit is provided which can output a stable transmission signal independently of the temperature characteristics of an amplitude modulating section. A signal generating section generates an amplitude signal and a phase signal. A regulator supplies a voltage which is controlled, depending on the amplitude signal, to the amplitude modulating section. An angle modulating section subjects the phase signal to angle modulation to output an angle-modulated signal. A temperature detecting section outputs temperature information of the amplitude modulating section. A gain control section controls a gain of a variable gain amplifier based on the temperature information of the amplitude modulating section. The variable gain amplifier amplifies the angle-modulated signal using the gain controlled by the gain control section. The amplitude modulating section subjects the angle-modulated signal to amplitude modulation using a voltage which is controlled, depending on the amplitude signal, to output an amplitude-modulated signal.

28 Claims, 24 Drawing Sheets

U.S. PATENT DOCUMENTS

2007/0013567 A1* 1/2007 Matsuura et al. ............ 341/143
2007/0254622 A1* 11/2007 Matsuura et al. ............ 455/403
2008/0031381 A1* 2/2008 Matsuura et al. ............ 375/297
2008/0068240 A1* 3/2008 Matsuura ............... 341/143
2008/0212707 A1* 9/2008 Rofougaran ............... 375/269

* cited by examiner

| INPUT SIGNAL (TEMPERATURE INFORMATION) | 0 | 10 | 20 | ...... | 70 | 80 |
|---|---|---|---|---|---|---|
| OUTPUT SIGNAL (GAIN CONTROL SIGNAL) | a0 | a1 | a2 | ...... | a7 | a8 |

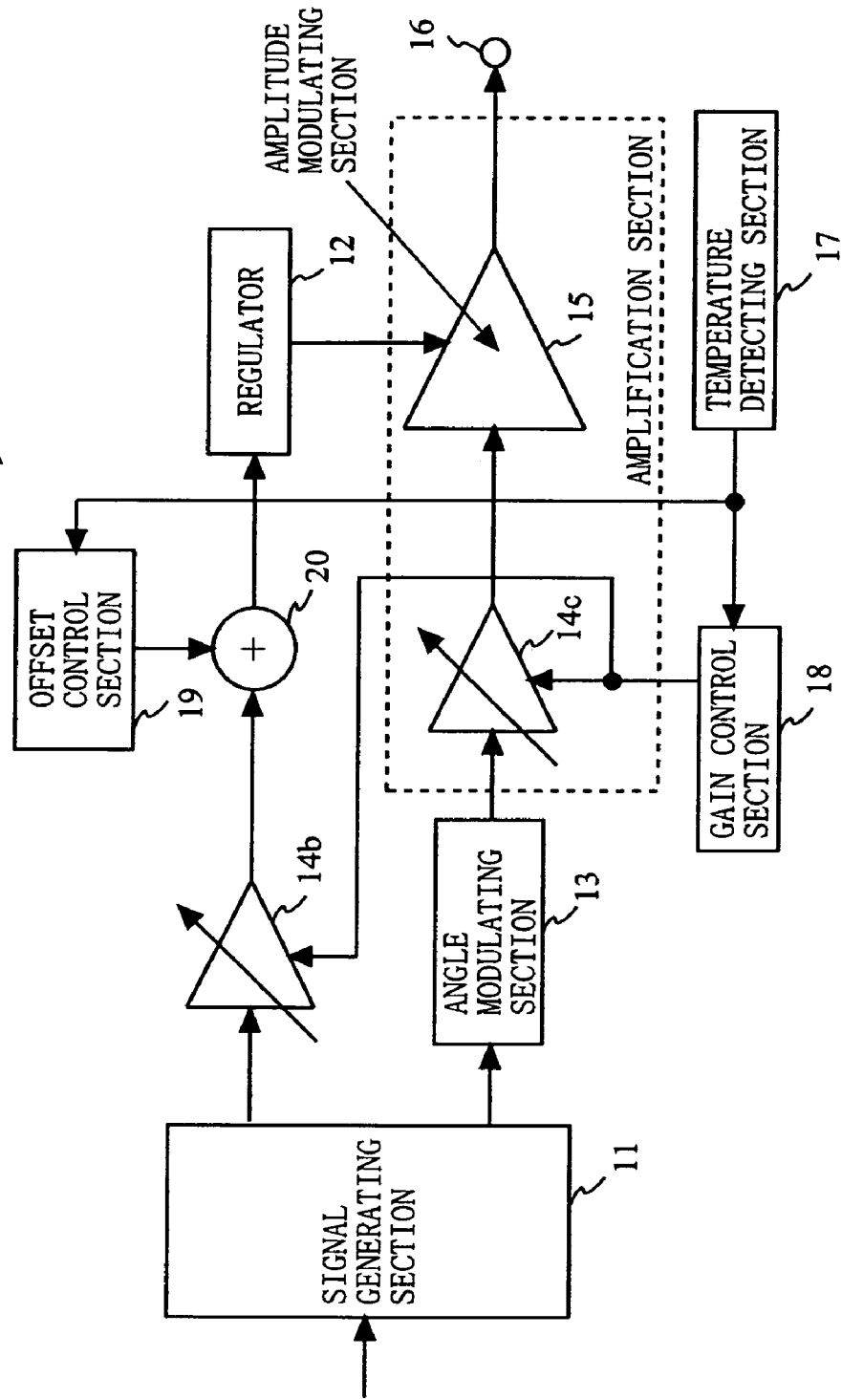

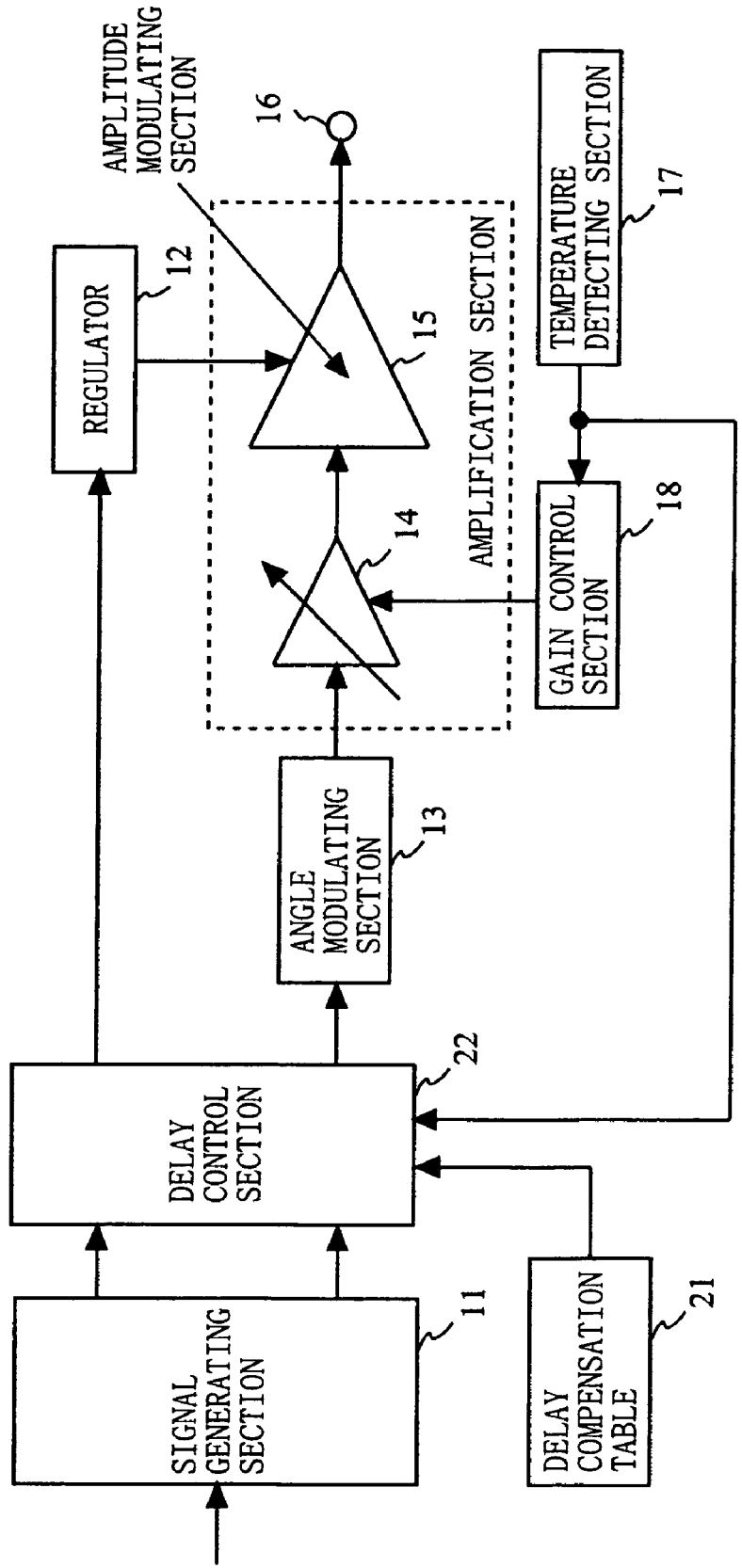

FIG. 21

| INPUT SIGNAL (TEMPERATURE INFORMATION) | 0 | 10 | 20 | · · · · · | 70 | 80 |
|---|---|---|---|---|---|---|
| DELAY TIME | t0 | t1 | t2 | · · · · · | t7 | t8 |

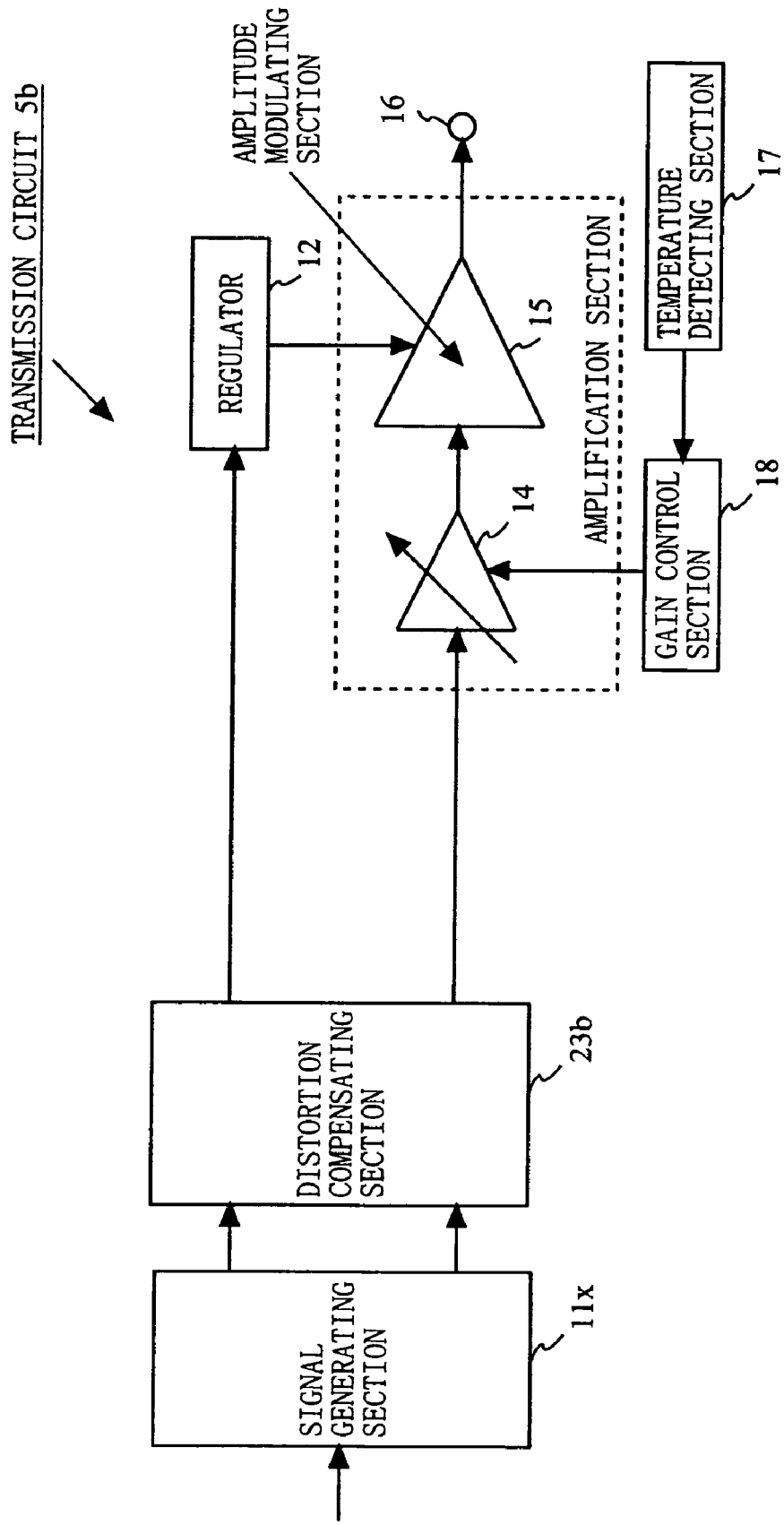

F I G. 2 3
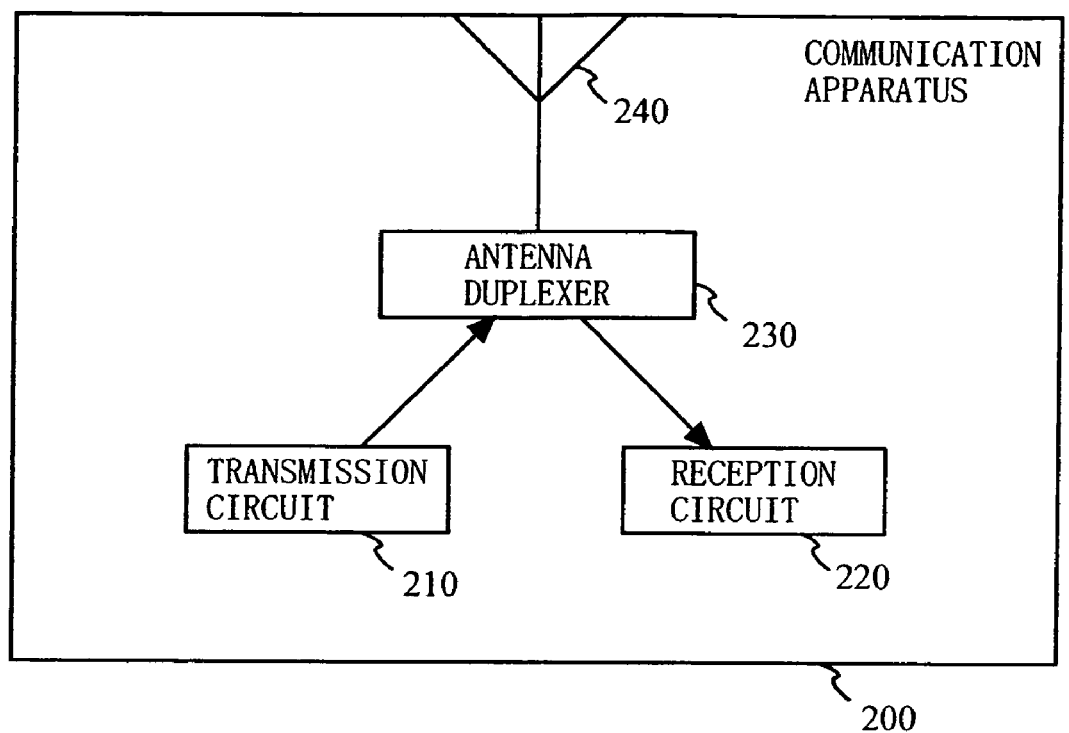

F I G. 2 4
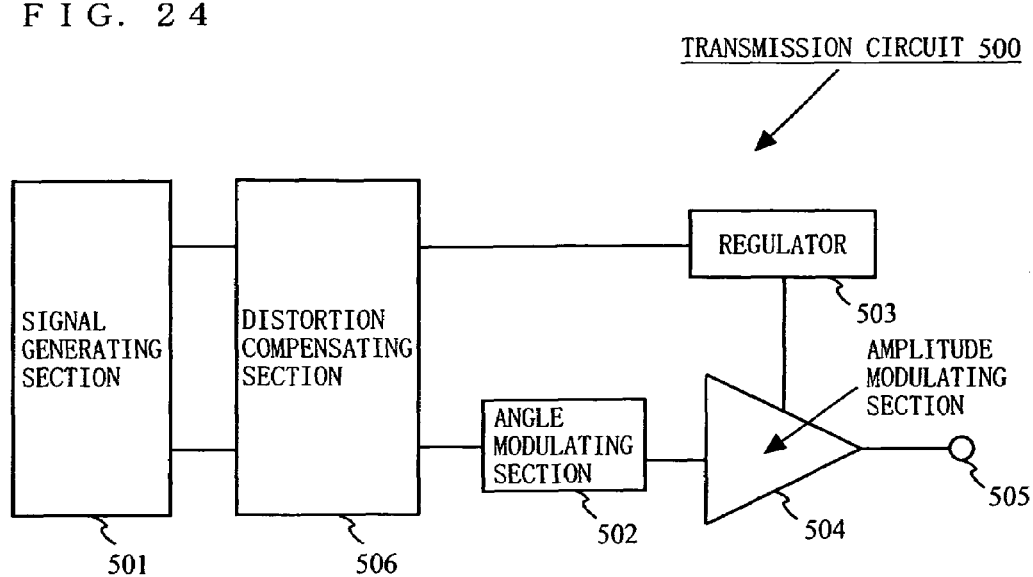
F I G. 2 5
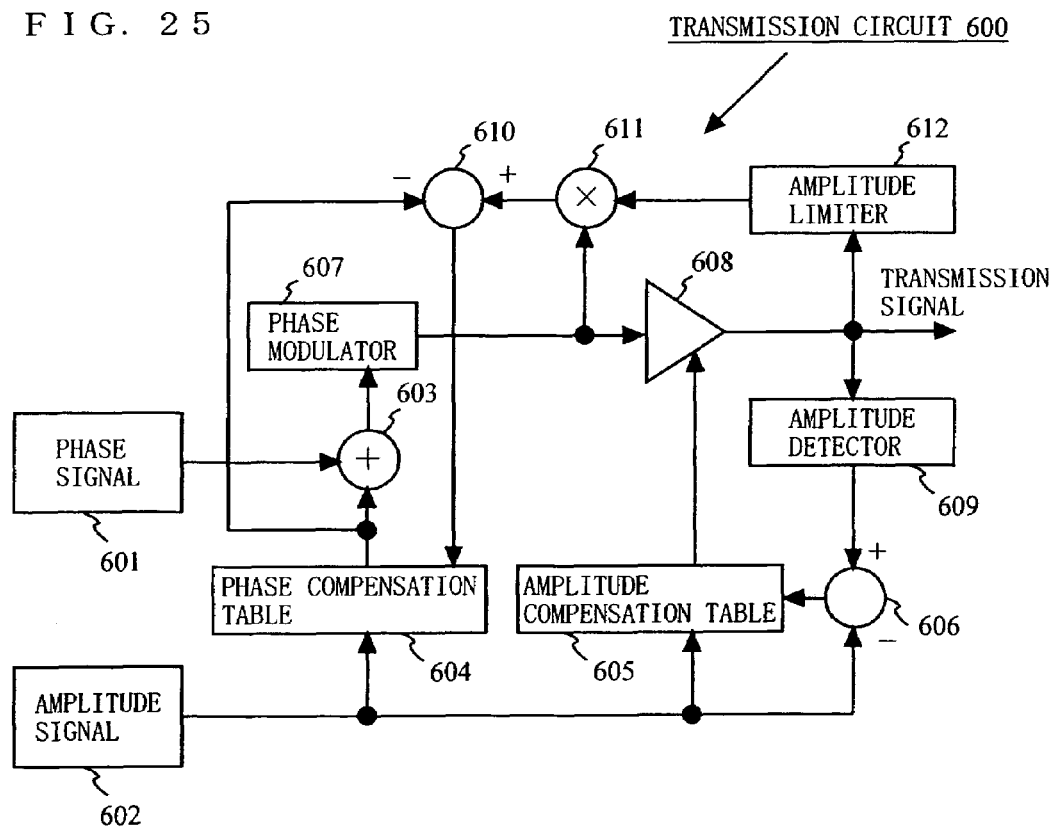

TRANSMISSION CIRCUIT AND COMMUNICATION APPARATUS EMPLOYING THE SAME

BACKGROUND OF THE INVENTION

1. Field of the Invention

The present invention relates to a transmission circuit for use in a communication apparatus for mobile telephony, wireless LAN, or the like. More particularly, the present invention relates to a transmission circuit which outputs a transmission signal having high linearity independently of the bandwidth and operates with high efficiency, and a communication apparatus employing the transmission circuit.

2. Description of the Background Art

There is a demand for a communication apparatus for mobile telephony, wireless LAN, or the like which can secure the linearity of an output signal and operate with low power consumption even when it operates within a broad bandwidth. In such a communication apparatus, a transmission circuit is employed which outputs a transmission signal having high linearity independently of the bandwidth and operates with high efficiency. Hereinafter, conventional transmission circuits will be described.

As a conventional transmission circuit, for example, there is a transmission circuit which utilizes a modulation method, such as quadrature modulation or the like, to generate a transmission signal (hereinafter referred to as a quadrature modulation circuit). Note that the quadrature modulation circuit is widely known and will not be described. As a conventional transmission circuit which has a smaller size and a higher efficiency than those of the quadrature modulation circuit, for example, there is a transmission circuit 500 illustrated in FIG. 24. FIG. 24 is a block diagram illustrating a configuration of the conventional transmission circuit 500. In FIG. 24, the conventional transmission circuit 500 comprises a signal generating section 501, an angle modulating section 502, a regulator 503, an amplitude modulating section 504, an output terminal 505, and a predistortion compensating section 506.

In the conventional transmission circuit 500, the signal generating section 501 generates an amplitude signal and a phase signal. The amplitude signal and the phase signal are input to the predistortion compensating section 506. The predistortion compensating section 506 distorts the input amplitude signal and phase signal so as to compensate for the nonlinearity of the amplitude modulating section 504. The amplitude signal output from the predistortion compensating section 506 is input to the regulator 503. The regulator 503 supplies a voltage depending on the input amplitude signal to the amplitude modulating section 504.

The phase signal output from the predistortion compensating section 506 is input to the angle modulating section 502. The angle modulating section 502 subjects the input phase signal to angle modulation to output an angle-modulated signal. The angle-modulated signal output from the angle modulating section 502 is input to the amplitude modulating section 504. The amplitude modulating section 504 subjects the angle-modulated signal to amplitude modulation using the voltage supplied from the regulator 503, to output an angle-modulated and amplitude-modulated signal. This modulated signal is output as a transmission signal from the output terminal 505. Thus, the conventional transmission circuit 500 compensates for the nonlinearity of the amplitude modulating section 504 using the predistortion compensating section 506, thereby outputting a transmission signal having high linearity.

However, the conventional transmission circuit 500 does not take into consideration a change in characteristics due to temperature of the amplitude modulating section 504. Therefore, when the characteristics of the amplitude modulating section 504 change due to the temperature, the linearity of the transmission signal is deteriorated.

U.S. Pat. No. 6,295,442 (hereinafter referred to as Patent Document 1) discloses a transmission circuit which compensates for distortions of an amplitude signal and a phase signal, depending on a change in characteristics of an amplitude modulator. FIG. 25 is a block diagram illustrating a configuration of a conventional transmission circuit 600 disclosed in Patent Document 1. In FIG. 25, the conventional transmission circuit 600 comprises a summer 603, a phase compensation table 604, an amplitude compensation table 605, a comparator 606, a phase modulator 607, an amplitude modulator 608, an amplitude detector 609, a comparator 610, a mixer 611, and an amplitude limiter 612.

A phase signal 601 is compensated for by the summer 603, depending on a set value in the phase compensation table 604, and thereafter, is input to the phase modulator 607. The phase modulator 607 subjects the input phase signal to phase modulation to generate a phase-modulated signal. The phase-modulated signal generated by the phase modulator 607 is input to the amplitude modulator 608. An amplitude signal 602 is compensated for, depending on a set value in the amplitude compensation table 605, and thereafter, is input to the amplitude modulator 608. The amplitude modulator 608 subjects the phase-modulated signal input from the phase modulator 607 to amplitude modulation using the amplitude signal input via the amplitude compensation table 605. The signal amplitude-modulated by the amplitude modulator 608 is output as a transmission signal.

The transmission signal is input to the amplitude detector 609. The amplitude detector 609 detects an amplitude component included in the transmission signal, and outputs the detected amplitude component to the comparator 606. The comparator 606 compares the amplitude component included in the transmission signal with the amplitude signal 602, and depending on the result of the comparison, updates the set value of the amplitude compensation table 605.

The transmission signal is also input to the amplitude limiter 612. The amplitude limiter 612 limits the amplitude component included in the transmission signal to output only a phase component included in the transmission signal. The phase component included in the transmission signal is multiplied by the phase-modulated signal in the mixer 611, and the result is input to the comparator 610. The comparator 610 compares the phase component multiplied in the mixer 611 with a set value of the phase compensation table 604, and depending on the result of the comparison, updates the set value of the phase compensation table 604.

Thus, the conventional transmission circuit 600 updates set values of the phase compensation table 604 and the amplitude compensation table 605, depending on a phase component and an amplitude component included in a transmission signal output from the amplitude modulator 608. Therefore, even if characteristics of the amplitude modulator 608 are changed due to temperature or the like, a transmission signal having high linearity can be generated.

However, in the conventional transmission circuit 600, set values of the phase compensation table 604 and the amplitude compensation table 605 are updated at any time, depending on a phase component and an amplitude component included in a transmission signal output from the amplitude modulator 608. Therefore, a complicated feedback control is required, so that a number of parts (e.g., the comparator 606, the amplitude detector 609, the comparator 610, the mixer 611, the amplitude limiter 612, etc.) need to be provided. Therefore, the conventional transmission circuit 600 has a large circuit scale. In addition, in the conventional transmission circuit 600, loss occurs when the transmission signal output from the amplitude modulator 608 is split into a plurality of signals, resulting in large power consumption for a transmission circuit.

SUMMARY OF THE INVENTION

Therefore, an object of the present invention is to provide a transmission circuit which has a small size and a high-efficiency operation, and outputs a transmission signal having high linearity without a complicated feedback control, and a communication apparatus employing the transmission circuit.

The present invention is directed to a transmission circuit for generating and outputting a transmission signal based on input data. To achieve the above-described object, the transmission circuit of the present invention comprises a signal generating section for generating an amplitude signal and an angle-modulated signal by subjecting the input data to signal processing, a regulator for outputting a signal depending on a magnitude of the amplitude signal, an amplification section for subjecting the angle-modulated signal to amplitude modulation by amplifying the angle-modulated signal, depending on the signal output from the regulator, to output an angle-modulated and amplitude-modulated signal, a temperature detecting section for detecting temperature information of the amplification section, and a gain control section for controlling a gain of the amplification section, depending on the temperature information detected by the temperature detecting section.

Preferably, the amplification section includes a variable gain amplifier for amplifying the angle-modulated signal output from the angle modulating section, depending on the gain controlled by the gain control section, and an amplitude modulating section for subjecting the angle-modulated signal to amplitude modulation by amplifying the angle-modulated signal amplified by the variable gain amplifier, depending on the signal output from the regulator, to output the angle-modulated and amplitude-modulated signal. In this case, the temperature detecting section detects the temperature information of the amplitude modulating section. The gain control section controls a gain of the variable gain amplifier, depending on the temperature information detected by the temperature detecting section.

The amplification section may also include amplitude modulating section for subjecting the angle-modulated signal to amplitude modulation by amplifying the angle-modulated signal, depending on the signal output by the regulator, to output the angle-modulated and amplitude-modulated signal. In this case, the temperature detecting section detects the temperature information of the amplitude modulating section. The gain control section controls a bias voltage which is to be supplied to the amplitude modulating section, depending on the temperature information detected by the temperature detecting section.

The transmission circuit may further comprise an offset compensating section for adding an offset value to the amplitude signal generated by the signal generating section, and an offset control section for controlling the offset value which is to be added to the amplitude signal by the offset compensating section, depending on the temperature information of the temperature detecting section.

Preferably, the gain control section is composed of an analog circuit.

The gain control section may control the gain of the amplification section based on a table previously setting gains for controlling the amplification section, depending on temperature characteristics of the amplification section. In this case the gain control section periodically controls the gain of the amplification section.

Preferably, the offset control section is composed of an analog circuit.

The offset control section may control the offset value which is to be added to the amplitude signal by the offset compensating section, based on a table previously setting offset values which are to be added to the amplitude signal, depending on temperature characteristics of the amplitude modulating section. In this case, the offset control section may periodically control the offset value which is to be added to the amplitude signal by the offset compensating section.

The transmission circuit may further comprise a predistortion compensating section provided at an output of the signal generating section.

Preferably, the regulator is a switching regulator. The regulator may be a series regulator. The regulator may have a configuration in which a switching regulator and a series regulator are connected in series.

Preferably, the temperature detecting section is mounted on the same chip on which a transistor included in the amplification section is mounted. The temperature detecting section may be mounted in the same module in which a transistor included in the amplification section is mounted. The temperature detecting section may be mounted on a substrate in a vicinity of the amplification section.

Preferably, the signal generating section includes a polar-coordinate signal generating section for generating the amplitude signal and the phase signal based on an amplitude component and a phase component obtained by subjecting the input data to signal processing, and an angle modulating section for subjecting the phase signal to angle modulation to output the angle-modulated signal.

The signal generating section may include a quadrature signal generating section for subjecting the input data to signal processing to generate a vector signal composed of an I signal and a Q signal orthogonal to each other, a vector modulating section for subjecting the vector signal to vector modulation, an envelope detecting section for detecting an envelope component of a signal output from the vector modulating section, and outputting the detected envelope component as the amplitude signal, and a limiter for limiting the envelope component of the signal output from the vector modulating section to a predetermined magnitude, and outputting the magnitude-limited signal as the angle-modulated signal.

Preferably, the transmission circuit further comprise a delay control section connected after the signal generating section, for adjusting timing of at least of the amplitude signal and the angle-modulated signal, depending on the temperature information detected by the temperature detecting section, so as to cause delay times of an amplitude component and a phase component included in the modulated signal to be equal to each other.

The transmission circuit may further comprise a delay compensation table previously setting a delay time optimal to a control of at least one of the amplitude signal and the angle-modulated signal. The delay control section reads out the delay time of at least one of the amplitude signal and the angle-modulated signal from the delay compensation table, depending on the temperature information detected by the temperature detecting section, and based on the read delay time, adjusts timing of outputting at least one of the amplitude signal and the angle-modulated signal.

The transmission circuit may further comprise a second variable gain amplifier connected between the signal generating section and the regulator, for amplifying the amplitude signal output from the signal generating section, depending on the gain controlled by the gain control section. The gain control section controls gains of the variable gain amplifier and the second variable gain amplifier, depending on the temperature information detected by the temperature detecting section.

The present invention is also directed to a transmission circuit for generating and outputting a transmission signal based on input data. To achieve the above-described object, the transmission circuit comprises a signal generating section for generating an amplitude signal and an angle-modulated signal by subjecting the input data to signal processing, a variable gain amplifier for amplifying the amplitude signal using a controlled gain, a regulator for outputting a signal depending on a magnitude of the amplitude signal amplified by the variable gain amplifier, an amplification section for subjecting the angle-modulated signal to amplitude modulation by amplifying the angle-modulated signal, depending on the signal output from the regulator, to output an angle-modulated and amplitude-modulated signal, a temperature detecting section for detecting temperature information of the amplification section, and a gain control section for controlling a gain of the variable gain amplifier, depending on the temperature information detected by the temperature detecting section.

Preferably, the transmission circuit further comprise an offset compensating section connected between the variable gain amplifier and the regulator, for adding an offset value to the amplitude signal amplified in the variable gain amplifier, and an offset control section for controlling the offset value which is to be added to the amplitude signal by the offset compensating section, depending on the temperature information detected by the temperature detecting section.

The present invention is also directed to a communication apparatus comprising the above-described transmission circuit. The communication apparatus comprises the transmission circuit for generating a transmission signal, and an antenna for outputting the transmission signal generated in the transmission circuit. The communication apparatus may further comprise a reception circuit for processing a reception signal received from the antenna, and an antenna duplexer for outputting the transmission signal generated in the transmission circuit to the antenna, and outputting the reception signal received from the antenna to the reception circuit.

As described above, according to the present invention, by a simple control that an angle-modulated signal which is input to an amplitude modulating section is amplified using a gain which is controlled, depending on temperature information of the amplitude modulating section, characteristics of the amplitude modulating section can be caused to be constant independently of the temperature. Thereby, the transmission circuit has a small circuit scale and can obtain a stable transmission signal without a complicated feedback control. In addition, since the transmission circuit does not split a transmission signal output from the amplitude modulating section into a plurality of signals, it is possible to suppress loss caused by the splitting of the transmission signal, resulting in low power consumption for a transmission circuit.

Also by controlling a bias voltage which is to be supplied to the amplitude modulating section, depending on the temperature of the amplitude modulating section, the transmission circuit can cause the characteristics of the amplitude modulating section to be constant independently of the temperature. Thereby, the transmission circuit can obtain an effect similar to that which obtained when the angle-modulated signal which is to be input to the amplitude modulating section is amplified using a gain which is controlled, depending on the temperature information of the amplitude modulating section.

Also, according to the communication apparatus of the present invention, by employing the above-described transmission circuit, the communication apparatus can be operated with low power consumption while securing the accuracy of an output signal within a broad bandwidth.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7A is a block diagram illustrating an exemplary configuration of a series regulator 12a;

FIG. 12A is a block diagram illustrating an exemplary configuration of an amplitude modulating section 15a;

FIG. 19C is a block diagram illustrating an exemplary configuration of a transmission circuit 3c according to the third embodiment of the present invention;

FIG. 20A is a block diagram illustrating an exemplary configuration of a transmission circuit 4a according to a fourth embodiment of the present invention;

FIG. 21 is a diagram illustrating an exemplary delay time set in a delay compensation table 21;

FIG. 22A is a block diagram illustrating an exemplary configuration of a transmission circuit 5a comprising a pre-distortion compensating section 23a;

FIG. 22B is a block diagram illustrating an exemplary configuration of a transmission circuit 5b comprising a pre-distortion compensating section 23b;

FIG. 23 is a block diagram illustrating an exemplary configuration of a communication apparatus according to a fifth embodiment of the present invention;

FIG. 24 is a block diagram illustrating a configuration of a conventional transmission circuit 500; and FIG. 25 is a block diagram illustrating a configuration of a conventional transmission circuit 600.

DESCRIPTION OF THE PREFERRED EMBODIMENTS

First Embodiment

Figure 1:
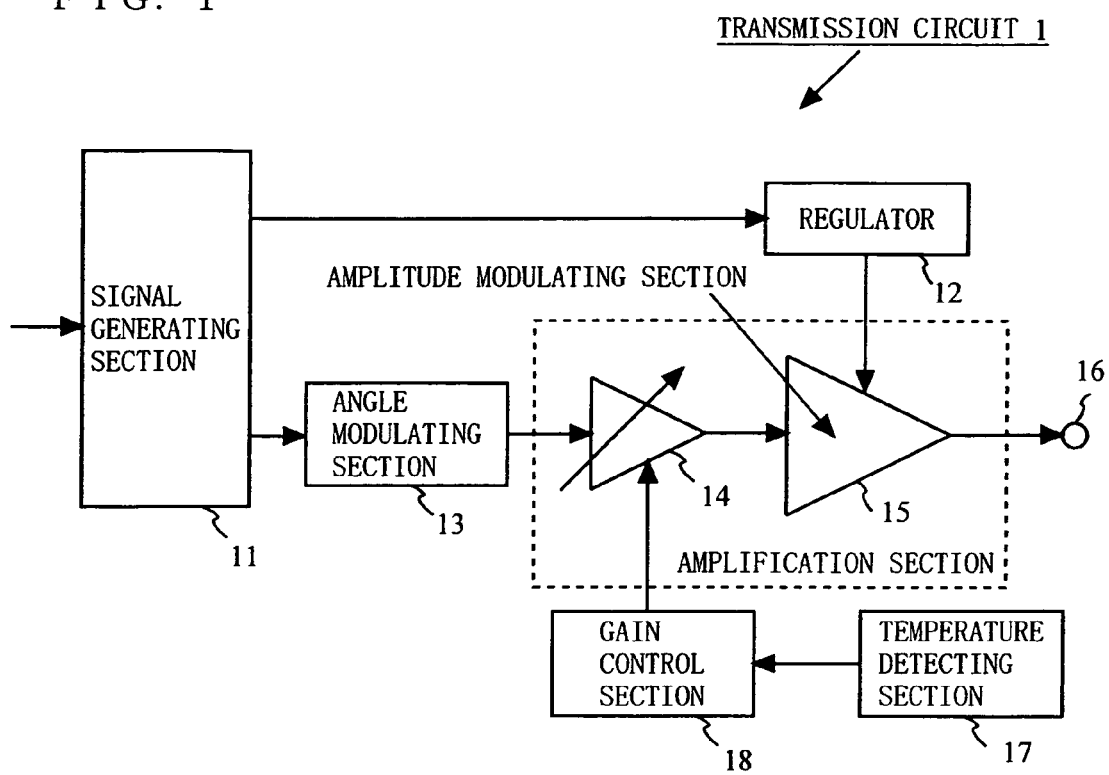
FIG. 1 is a block diagram illustrating an exemplary configuration of a transmission circuit 1 according to a first embodiment of the present invention.

FIG. 1 is a block diagram illustrating an exemplary configuration of a transmission circuit 1 according to a first embodiment of the present invention. In FIG. 1, the transmission circuit 1 comprises a signal generating section 11, a regulator 12, an angle modulating section 13, a variable gain amplifier 14, an amplitude modulating section 15, an output terminal 16, a temperature detecting section 17, and a gain control section 18. Note that the variable gain amplifier 14 and the amplitude modulating section 15 may be simply described as an amplification section.

The signal generating section 11 generates an amplitude signal and a phase signal, depending on input data. For example, the signal generating section 11 generates an amplitude signal and a phase signal based on an amplitude component and a phase component obtained by subjecting the input data to signal processing. Note that the signal generating section 11 may be referred to as a polar-coordinate signal generating section since the amplitude signal and the phase signal are polar-coordinate signals. The amplitude signal generated by the signal generating section 11 is input to the regulator 12. The regulator 12 outputs a signal depending on a magnitude of the input amplitude signal. Typically, the regulator 12 outputs a signal which is proportional to the magnitude of the amplitude signal. The signal output from the regulator 12 is input to the amplitude modulating section 15.

On the other hand, the phase signal generated by the signal generating section 11 is input to the angle modulating section 13. The angle modulating section 13 subjects the phase signal to angle modulation to output an angle-modulated signal. The angle-modulated signal is input to the variable gain amplifier 14. The variable gain amplifier 14 amplifies or attenuates the input angle-modulated signal, depending on a gain controlled by the gain control section 18, and outputs the result. The angle-modulated signal amplified or attenuated by the variable gain amplifier 14 is input to the amplitude modulating section 15. The amplitude modulating section 15 subjects the input angle-modulated signal to amplitude modulation using a signal input from the regulator 12, to output an angle-modulated and amplitude-modulated signal. This modulated signal amplitude-modulated by the amplitude modulating section 15 is output as a transmission signal from the output terminal 16.

The temperature detecting section 17 detects temperature information of the amplitude modulating section 15 using a predetermined method. As the predetermined method, for example, the temperature detecting section 17 uses a temperature sensor to detect the temperature information of the amplitude modulating section 15. Alternatively, the temperature detecting section 17 may monitor an output power of the amplitude modulating section 15 to detect the temperature information of the amplitude modulating section 15, or may use a diode to monitor a current flowing through the diode to detect the temperature information of the amplitude modulating section 15. Note that the temperature detecting section 17 is assumed to be placed in the vicinity of the amplitude modulating section 15 so as to detect the temperature information of the amplitude modulating section 15. The temperature information output from the temperature detecting section 17 is input to the gain control section 18. The gain control section 18 controls a gain of the variable gain amplifier 14 based on the temperature information output from the temperature detecting section 17.

Figure 2:
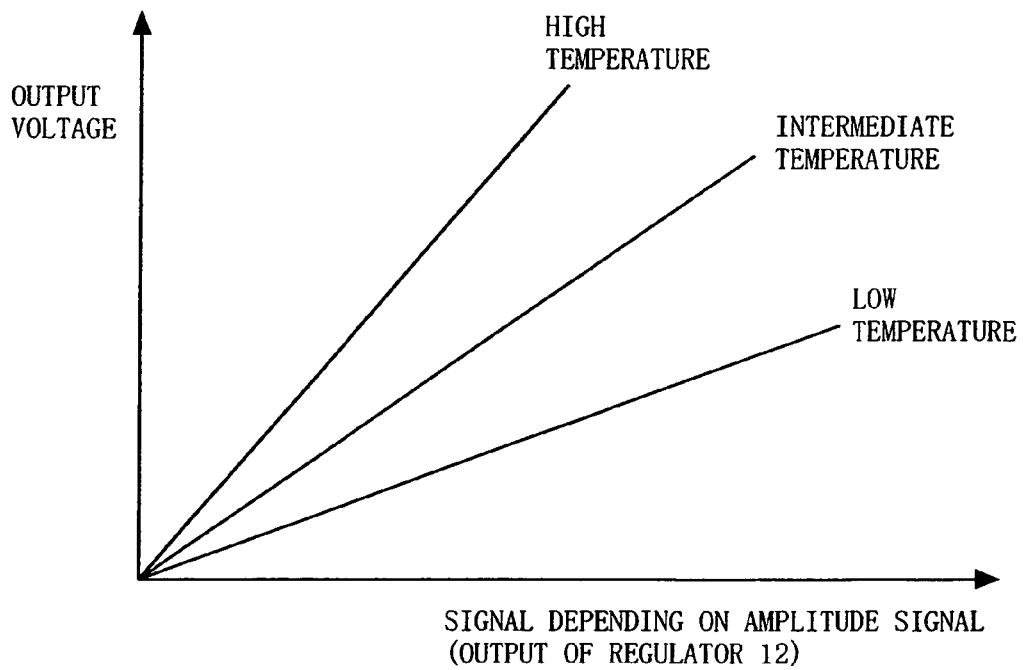
FIG. 2 is a diagram illustrating exemplary temperature characteristics of an amplitude modulating section 15.

FIG. 2 is a diagram illustrating exemplary temperature characteristics of the amplitude modulating section 15. Specifically, FIG. 2 illustrates temperature characteristics of the amplitude modulating section 15 when the amplitude modulating section 15 is at high temperature, intermediate temperature and low temperature. In FIG. 2, the horizontal axis represents a signal (i.e., the output of the regulator 12) depending on the amplitude signal input from the regulator 12 to the amplitude modulating section 15. The vertical axis represents a voltage (i.e., the output voltage of the amplitude modulating section 15) of the modulated signal output from the amplitude modulating section 15. Note that the voltage of the modulated signal output from the amplitude modulating section 15 can be obtained from an output power and a load resistance of the amplitude modulating section 15. As illustrated in FIG. 2, as the temperature of the amplitude modulating section 15 increases, the voltage of the modulated signal output from the amplitude modulating section 15 increases. Such tendency is significant, particularly when the output voltage of the amplitude modulating section 15 is small.

Figure 3:
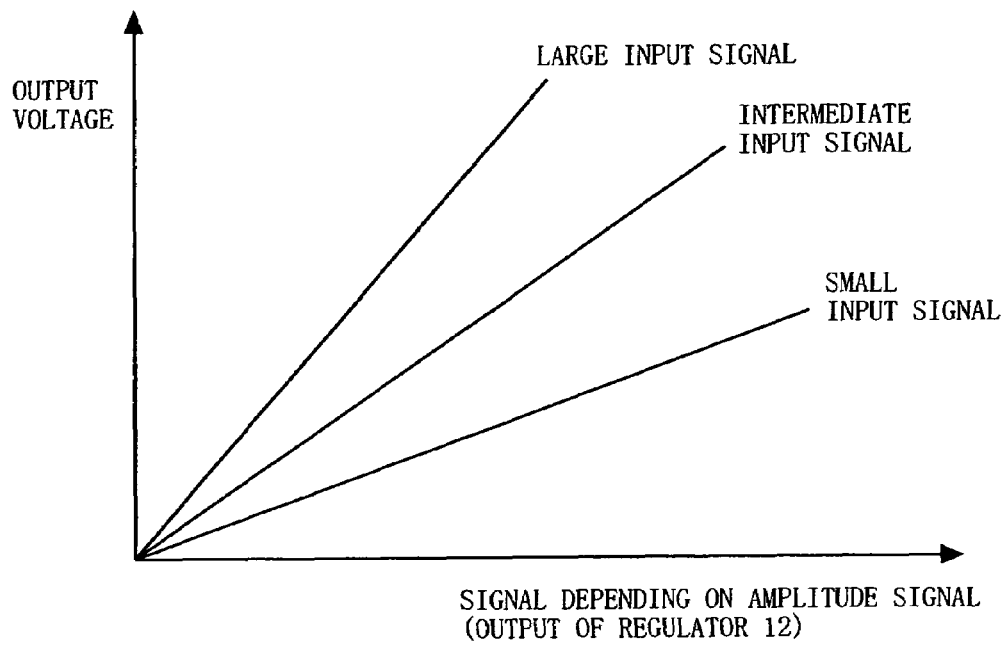
FIG. 3 is a diagram illustrating exemplary characteristics of the amplitude modulating section 15 when a magnitude of an input angle-modulated signal is changed.

FIG. 3 is a diagram illustrating exemplary characteristics of the amplitude modulating section 15 when a magnitude of the input angle-modulated signal is changed. Specifically, FIG. 3 illustrates characteristics of the amplitude modulating section 15 when the magnitude of the input angle-modulated signal (i.e., the input signal) is large, intermediate, and small. In FIG. 3, the horizontal axis represents a signal (i.e., the output of the regulator 12) depending on the amplitude signal input from the regulator 12 to the amplitude modulating section 15. The vertical axis represents a voltage (i.e., the output voltage of the amplitude modulating section 15) of the modulated signal output from the amplitude modulating section 15. As illustrated in FIG. 3, as the magnitude of the angle-modulated signal input to the amplitude modulating section 15 increases, the voltage of the modulated signal output from the amplitude modulating section 15 increases.

Figure 4:
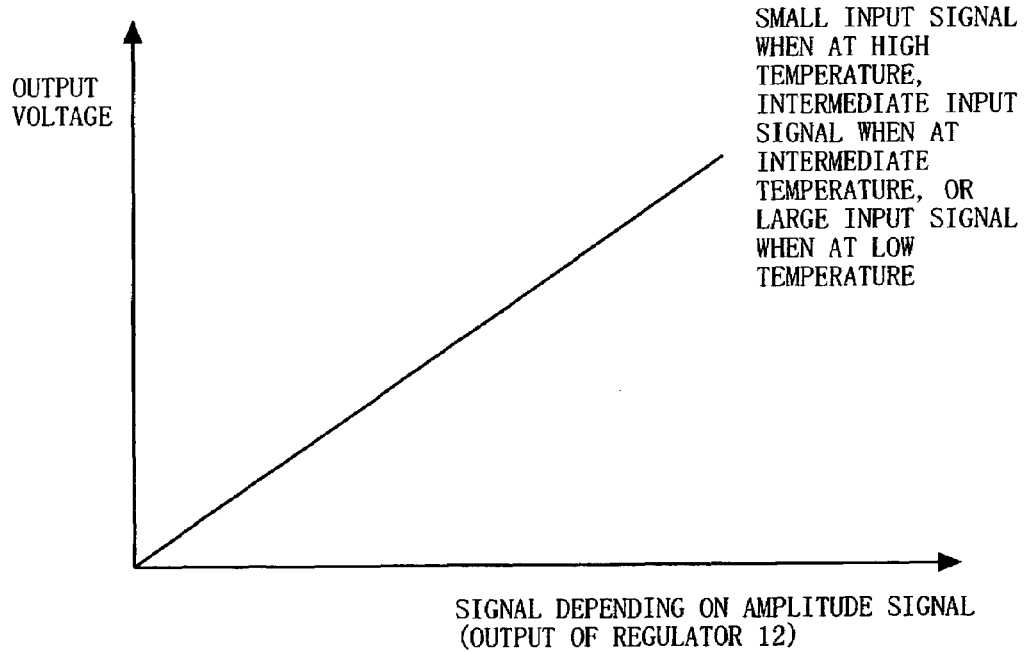
FIG. 4 is a diagram illustrating characteristics of the amplitude modulating section 15 when the magnitude of the input signal is controlled, depending on temperature information.

In the transmission circuit 1, by utilizing the characteristics of the amplitude modulating section 15 of FIGS. 2 and 3, the characteristics of the amplitude modulating section 15 are caused to be constant independently of the temperature. Specifically, in the transmission circuit 1, by decreasing the angle-modulated signal which is to be input to the amplitude modulating section 15 with an increase in the temperature of the amplitude modulating section 15, the characteristics of the amplitude modulating section 15 are caused to be constant independently of the temperature as illustrated in FIG. 4. Thereby, the transmission circuit 1 can obtain an output of a stable transmission signal independently of the temperature of the amplitude modulating section 15.

Next, a detail of the gain control section 18 will be described. The temperature information of the amplitude modulating section 15 detected by the temperature detecting section 17 is input to the gain control section 18. The gain control section 18 controls the gain of the variable gain amplifier 14 based on the input signal from the temperature detecting section 17 (i.e., temperature information of the amplitude modulating section 15) so that the angle-modulated signal which is to be input to the amplitude modulating section 15 is adjusted into an appropriate magnitude. Specifically, the gain control section 18 outputs a gain control signal for controlling the gain of the variable gain amplifier 14 based on the input temperature information.

Figures 5, 6:
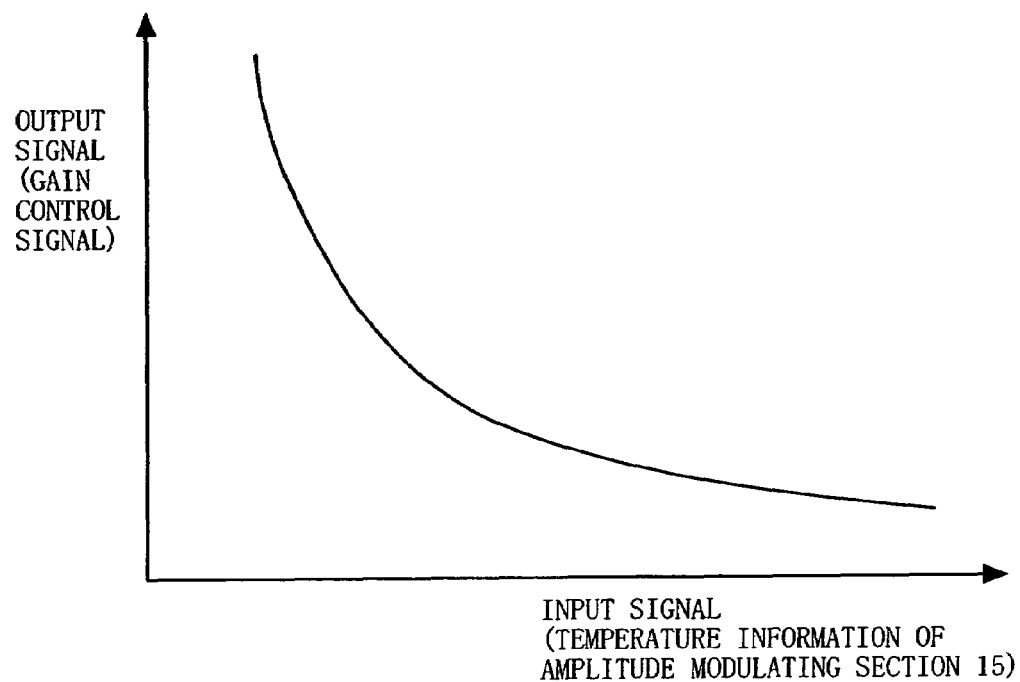
FIG. 5 is a diagram illustrating an exemplary gain control signal output by a gain control section 18 composed of an analog circuit.
FIG. 6 is a diagram for describing a gain control signal output by a gain control section 18 composed of a digital circuit.

The gain control section 18 may be composed of either an analog circuit or a digital circuit. FIG. 5 is a diagram illustrating an exemplary gain control signal output by the gain control section 18 composed of an analog circuit. For example, as illustrated in FIG. 5, the gain control section 18 composed of an analog circuit is designed to output an appropriate gain control signal with respect to the input signal from the temperature detecting section 17 (i.e., the temperature information of the amplitude modulating section 15), thereby achieving a desired function.

FIG. 6 is a diagram for describing a gain control signal output by the gain control section 18 composed of a digital circuit. For example, as illustrated in FIG. 6, with respect to the input signal from the temperature detecting section 17 (i.e., the temperature information of the amplitude modulating section 15), the gain control section 18 composed of a digital circuit outputs an appropriate gain control signal corresponding to the temperature information by an interpolation process based on a table which holds an appropriate gain control signal, thereby achieving a desired function.

The gain control section 18 may output the gain control signal with predetermined timing, in real time, or periodically. For example, when the transmission circuit 1 is applied to a communication apparatus which does not simultaneously perform transmission and reception, the gain control section 18 may output the gain control signal immediately before the start of transmission. For example, when the transmission circuit 1 is applied to a communication apparatus which simultaneously performs transmission and reception, the gain control section 18 may output the gain control signal in units of a slot or a frame. Alternatively, the gain control section 18 may output the gain control signal when modulation modes of the transmission circuit are changed, or when powers of the transmission circuit are changed.

Figure 7A:
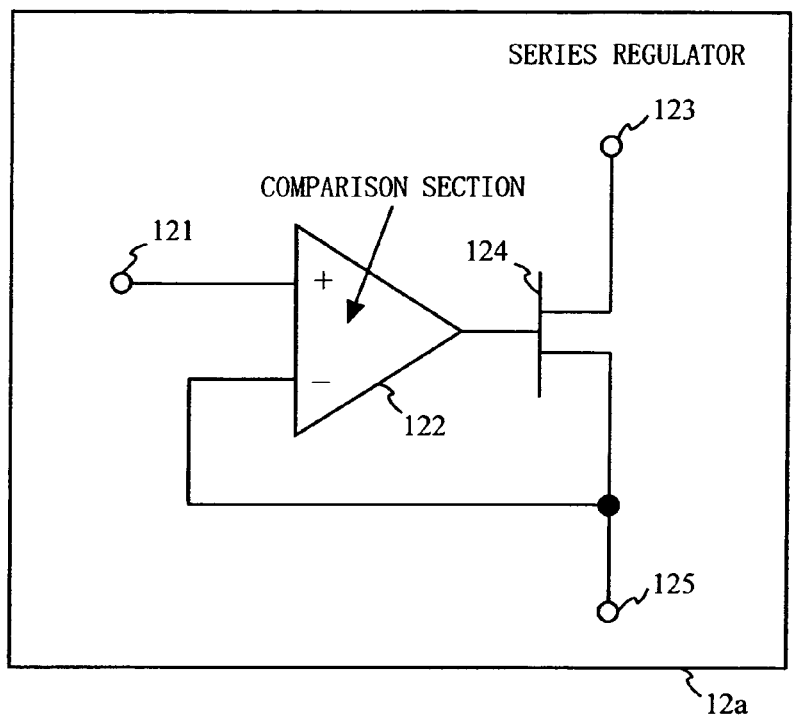

Next, a detail of the regulator 12 will be described. For example, the regulator 12 can be composed of a voltage drive type series regulator. FIG. 7A is a block diagram illustrating an exemplary configuration of a series regulator 12a. In FIG. 7A, the series regulator 12a includes an input terminal 121, a comparison section 122, a power supply terminal 123, a transistor 124, and an output terminal 125. Here, the transistor 124 is assumed to be a field effect transistor. An amplitude signal is input from the signal generating section 11 to the input terminal 121. The amplitude signal is input via the comparison section 122 to a gate terminal of the transistor 124. A direct-current voltage is supplied from the power supply terminal 123 to a drain terminal of the transistor 124. The transistor 124 outputs, from a source terminal thereof, a voltage which is proportional to the input amplitude signal. The voltage output from the source terminal of the transistor 124 is fed back to the comparison section 122. The comparison section 122 adjusts the magnitude of the amplitude signal input to the gate terminal of the transistor 124 based on the feedback voltage. Thus, the series regulator 12a can stably supply the voltage proportional to the amplitude signal from the output terminal 125. Note that the transistor 124 may be a bipolar transistor.

Figure 7B:
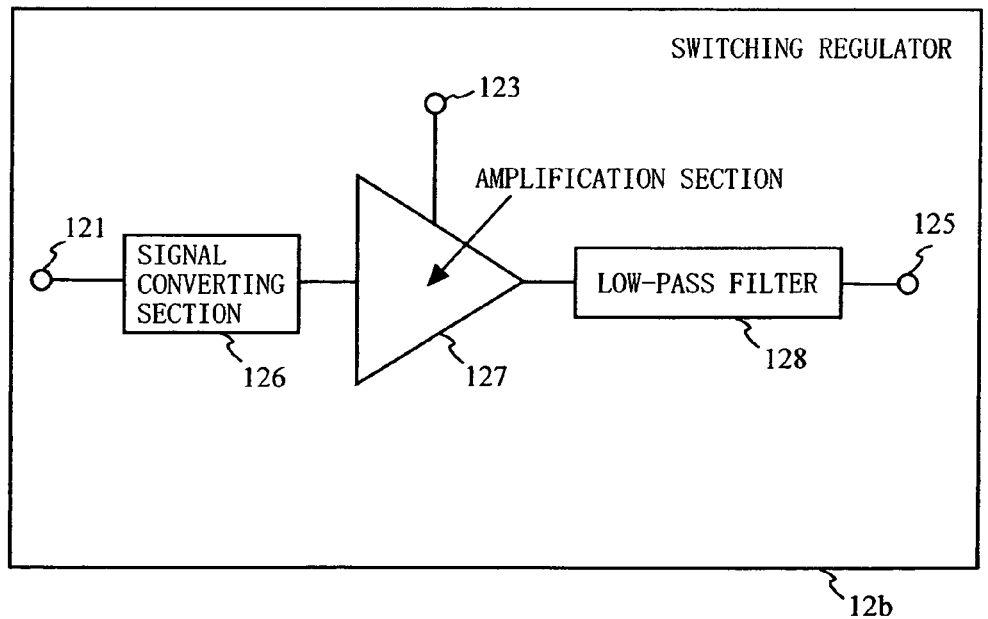
FIG. 7B is a block diagram illustrating an exemplary configuration of a switching regulator 12b.

For example, the regulator 12 can be composed of a voltage drive type switching regulator. FIG. 7B is a block diagram illustrating an exemplary configuration of a switching regulator 12b. In FIG. 7B, the switching regulator 12b includes an input terminal 121, a power supply terminal 123, a signal converting section 126, an amplification section 127, a low-pass filter 128, and an output terminal 125. An amplitude signal is input from the signal generating section 11 to the input terminal 121. The amplitude signal is input to the signal converting section 126. The signal converting section 126 converts the input amplitude signal into a pulse-width-modulated or delta-sigma-modulated signal. The signal converted by the signal converting section 126 is input to the amplification section 127. The amplification section 127 amplifies and outputs the input signal. Note that a direct-current voltage is supplied from the power supply terminal 123 to the amplification section 127. As the amplification section 127, a high-efficiency switching amplification section (e.g., a class-D amplification section, etc.) is employed.

The signal output by the amplification section 127 is input to the low-pass filter 128. The low-pass filter 128 removes a spurious component, such as quantization noise, switching noise, or the like, from the signal output by the amplification section 127. The signal from which the spurious component is removed by the low-pass filter 128 is output as a voltage proportional to the amplitude signal from the output terminal 125. Note that the switching regulator 12b may feed the signal output from the low-pass filter 128 back to the signal converting section 126 so as to stabilize the output voltage. Thus, the transmission circuit 1 can reduce power consumption for a transmission circuit, using the high-efficiency switching regulator 12b.

Figure 7C:
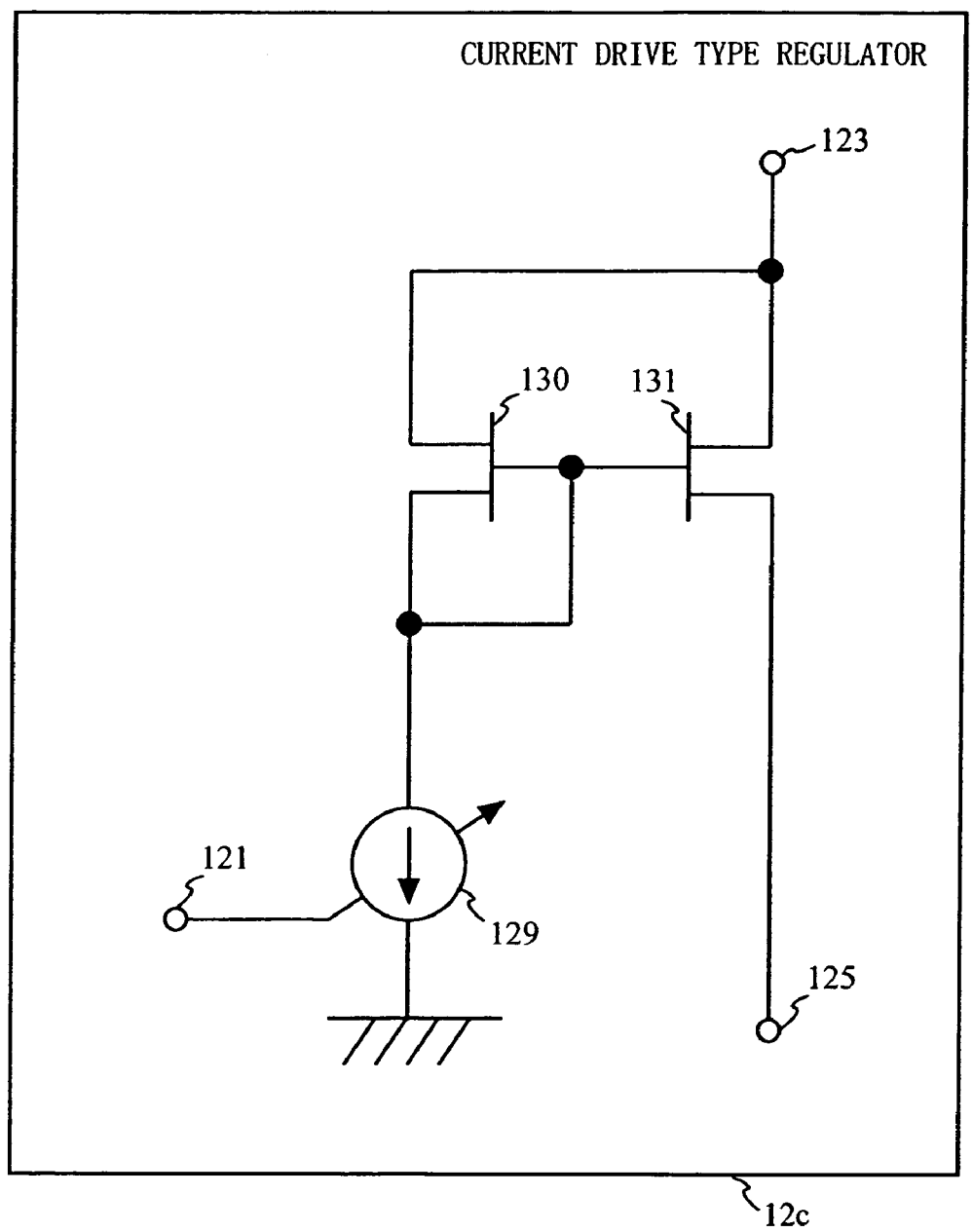
FIG. 7C is a block diagram illustrating an exemplary configuration of a current drive type regulator 12c.

For example, the regulator 12 can be composed of a current drive type regulator. FIG. 7C is a block diagram illustrating an exemplary configuration of a current drive type regulator 12c. In FIG. 7C, the current drive type regulator 12c includes an input terminal 121, a power supply terminal 123, a variable current source 129, a transistor 130, a transistor 131, and an output terminal 125. An amplitude signal is input from the signal generating section 11 to the input terminal 121. A direct-current voltage is supplied to the power supply terminal 123. The amplitude signal input via the input terminal 121 is output via the variable current source 129, the transistor 130, and the transistor 131, as a current proportional to the amplitude signal, from the output terminal 125. Such a current drive type regulator 12c is useful when the amplitude modulating section 15 is composed of a bipolar transistor. Note that the transistor 130 and the transistor 131 may be either a field effect transistor or a bipolar transistor.

Figure 7D:
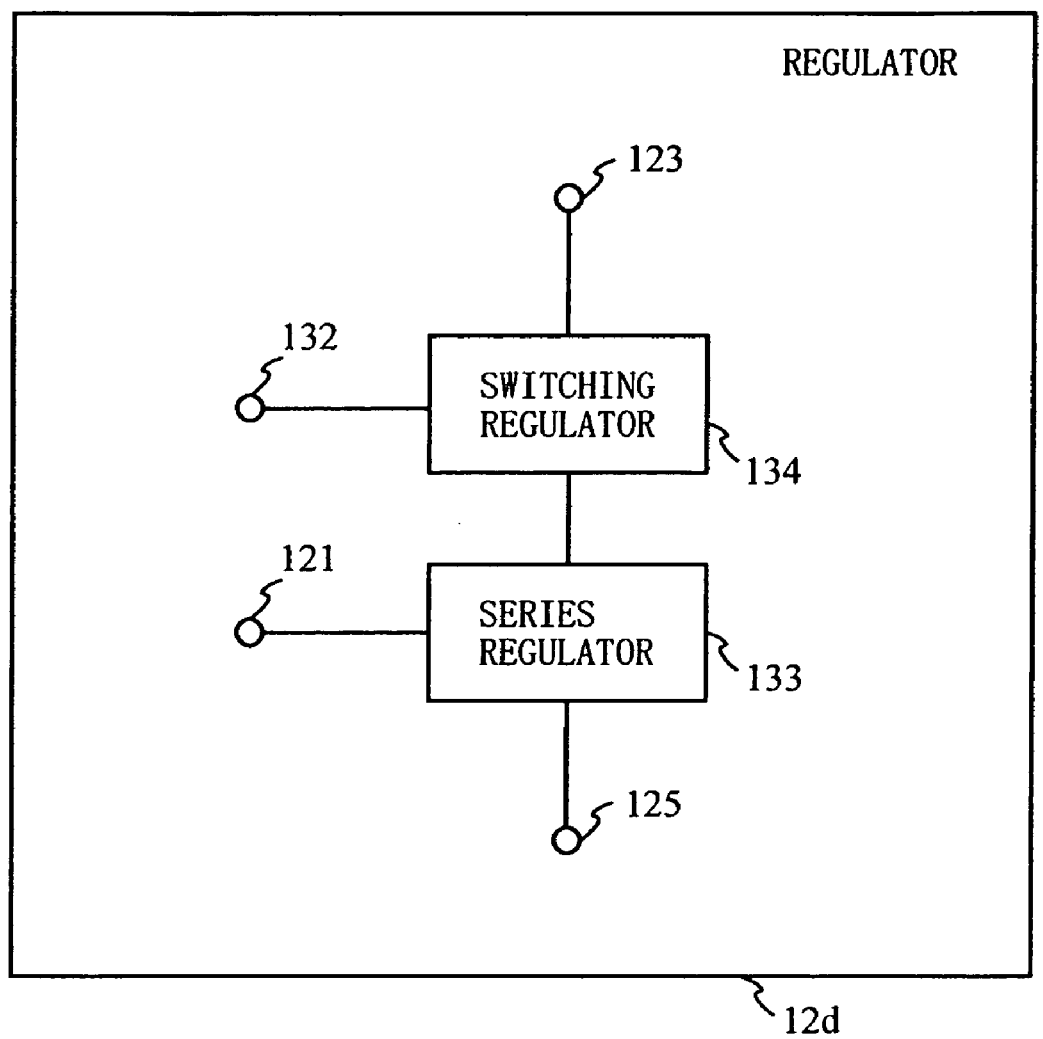
FIG. 7D is a block diagram illustrating an exemplary configuration of a regulator 12d composed of a combination of a series regulator and a switching regulator.

The regulator 12 can also be composed of a combination of a series regulator and a switching regulator. FIG. 7D is a block diagram illustrating an exemplary configuration of a regulator 12d composed of a combination of a series regulator and a switching regulator. In FIG. 7D, the regulator 12d includes an input terminal 121, an input terminal 132, a power supply terminal 123, a series regulator 133, and a switching regulator 134. For example, the series regulator 133 has the configuration of FIG. 7A. For example, the switching regulator 134 has the configuration of FIG. 7B. An amplitude signal is input from the signal generating section 11 to the input terminal 121. Information about a maximum value of the amplitude signal is input from the signal generating section 11 to the input terminal 132. The signal generating section 11 changes a magnitude of a signal which is to be input to the input terminal 132, when an average output power of the transmission circuit 1 changes or when the type of the modulated signal changes. Since the signal input to the input terminal 132 has a smaller frequency than that of the amplitude signal, the switching regulator 134 can be operated with high efficiency. Also, since the voltage supplied from the switching regulator 134 is controlled and optimized, the series regulator 133 can operate with high efficiency. Therefore, by employing the regulator 12d composed of a combination of a series regulator and a switching regulator, the transmission circuit 1 can reduce power consumption for a transmission circuit.

For example, the temperature detecting section 17 can obtain the temperature information of the amplitude modulating section 15 by monitoring a current of a diode which is produced by the same process with which a device included in the amplitude modulating section 15 is produced. If the diode is mounted on the same chip on which a transistor included in the amplitude modulating section 15 is mounted, the temperature detecting section 17 can correctly detect the temperature of the transistor included in the amplitude modulating section 15. Alternatively, if it is difficult to mount the diode on the same chip on which the transistor included in the amplitude modulating section 15 is mounted, the temperature detecting section 17 may be mounted on the same module on which the amplitude modulating section 15 is mounted, or on a substrate in the vicinity of the amplitude modulating section 15.

As described above, according to the transmission circuit 1 of the first embodiment of the present invention, the angle-modulated signal which is to be input to the amplitude modulating section 15 is amplified by a gain which is controlled, depending on the temperature information of the amplitude modulating section 15. By such a simple control, the characteristics of the amplitude modulating section 15 can be caused to be constant independently of the temperature. Thereby, the transmission circuit 1 does not need to perform a complicated feedback control, and a stable transmission signal can be obtained with a small circuit scale independently of the temperature of the amplitude modulating section 15. In addition, since the transmission circuit 1 does not split the transmission signal output from the amplitude modulating section 15 into a plurality of signals, it is possible to suppress loss caused by the splitting of the transmission signal, resulting in low power consumption for a transmission circuit.

Figure 8A:
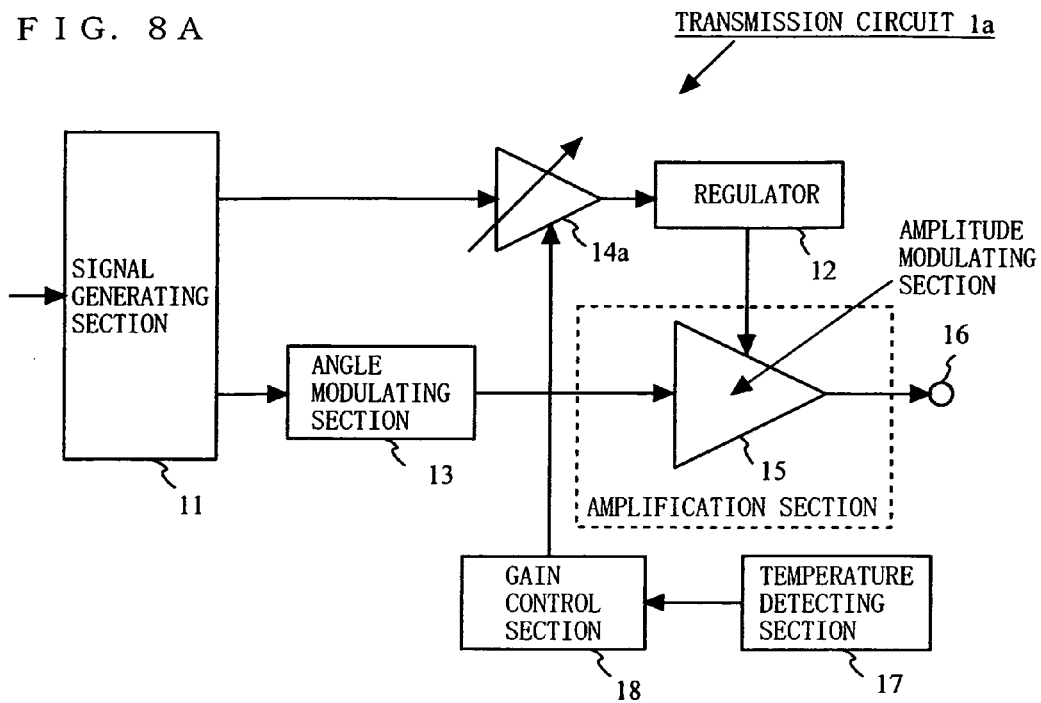
FIG. 8A is a block diagram illustrating an exemplary configuration of a transmission circuit 1a according to the first embodiment of the present invention.

Note that the transmission circuit 1 may have a configuration in which a variable gain amplifier 14a is provided before the regulator 12 (see a transmission circuit 1a illustrated in FIG. 8A). FIG. 8A is a block diagram illustrating an exemplary configuration of the transmission circuit 1a according to the first embodiment of the present invention. In FIG. 8A, the variable gain amplifier 14a amplifies or attenuates an input amplitude signal, depending on the gain controlled by the gain control section 18, and outputs the result. Also in this case, the transmission circuit 1a can obtain an effect similar to that of the transmission circuit 1.

Figure 8B:
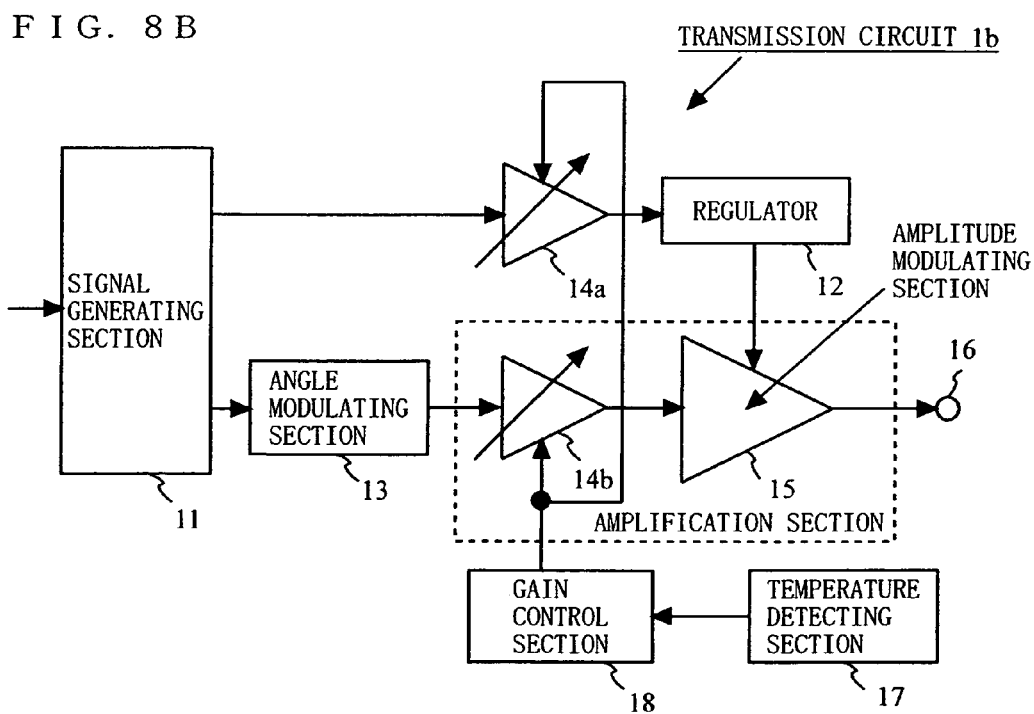
FIG. 8B is a block diagram illustrating an exemplary configuration of a transmission circuit 1b according to the first embodiment of the present invention.

Note that the transmission circuit 1 may have a configuration in which a variable gain amplifier is provided both before the regulator 12 and before the amplitude modulating section 15 (see a transmission circuit 1b illustrated in FIG. 8B). FIG. 8B is a block diagram illustrating an exemplary configuration of the transmission circuit 1b according to the first embodiment of the present invention. In FIG. 8B, a variable gain amplifier 14a amplifies or attenuates an input amplitude signal, depending on the gain controlled by the gain control section 18, and outputs the result. A variable gain amplifier 14b amplifies or attenuates an input angle-modulated signal, depending on the gain controlled by the gain control section 18, and outputs the result. Also in this case, the transmission circuit 1b can obtain an effect similar to that of the transmission circuit 1.

Figure 9:
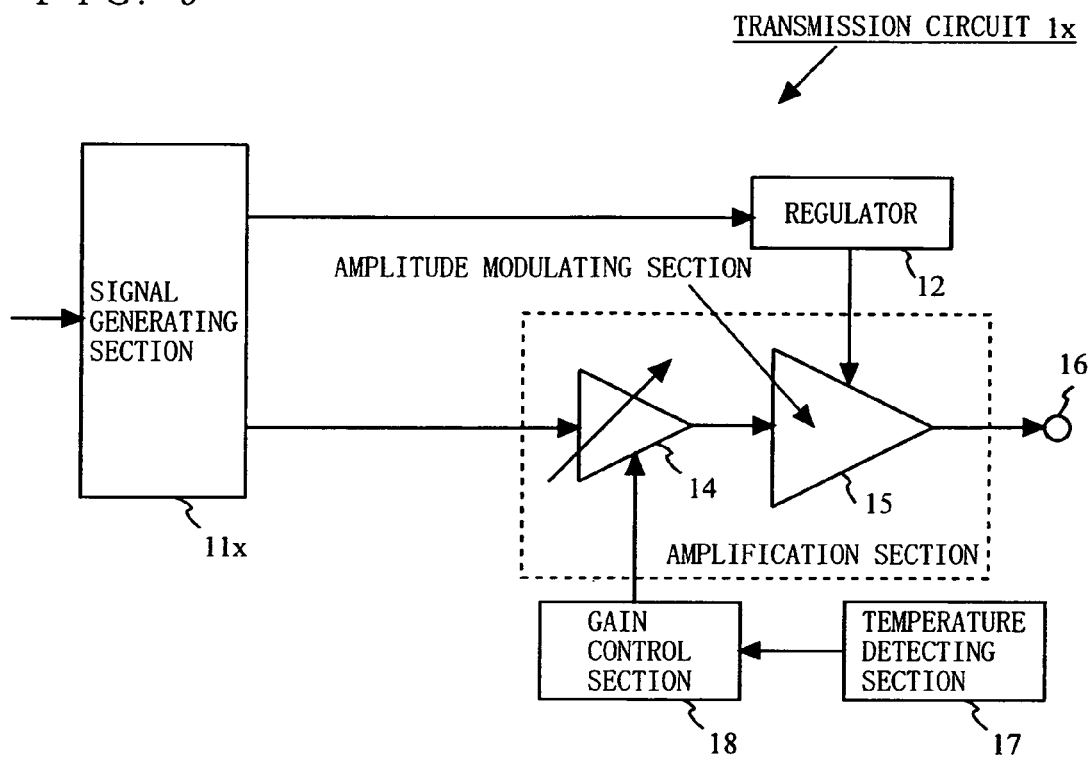
FIG. 9 is a block diagram illustrating an exemplary configuration of a transmission circuit 1x according to the first embodiment of the present invention.
Figure 10:
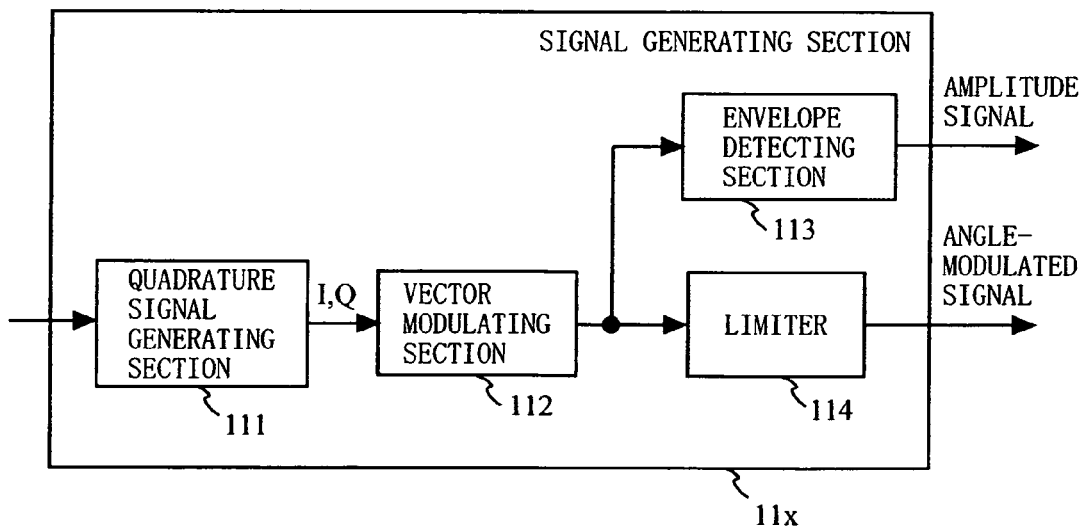
FIG. 10 is a block diagram illustrating an exemplary configuration of a signal generating section 11x.

The transmission circuit 1 may have a configuration in which a signal generating section 11x generates an angle-modulated signal instead of the angle modulating section (see a transmission circuit 1x illustrated in FIG. 9). FIG. 9 is a block diagram illustrating an exemplary configuration of the transmission circuit 1x according to the first embodiment of the present invention. In FIG. 9, the signal generating section 11x subjects input data to predetermined signal processing to generate an amplitude signal and an angle-modulated signal. FIG. 10 is a block diagram illustrating an exemplary configuration of the signal generating section 11x. In FIG. 10, the signal generating section 11x includes a quadrature signal generating section 111, a vector modulating section 112, an envelope detecting section 113, and a limiter 114. The quadrature signal generating section 111 subjects input data to signal processing to generate a vector signal composed of an in-phase signal and a quadrature-phase signal (hereinafter referred to as an I signal and a Q signal) orthogonal to each other. The vector signal is input to the vector modulating section 112.

The vector modulating section 112 modulates the vector signal. The vector modulating section 112 is, for example, a quadrature modulator. A signal output from the vector modulating section 112 is input to the envelope detecting section 113 and the limiter 114. The envelope detecting section 113 detects an envelope component of the signal output from the vector modulating section 112, and outputs the detected envelope component as an amplitude signal. The limiter 114 limits the envelope component of the signal output from the vector modulating section 112 to a predetermined magnitude, and outputs the magnitude-limited signal as an angle-modulated signal. Also in this case, the transmission circuit 1x can obtain an effect similar to that of the transmission circuit 1.

Second Embodiment

Figure 11:
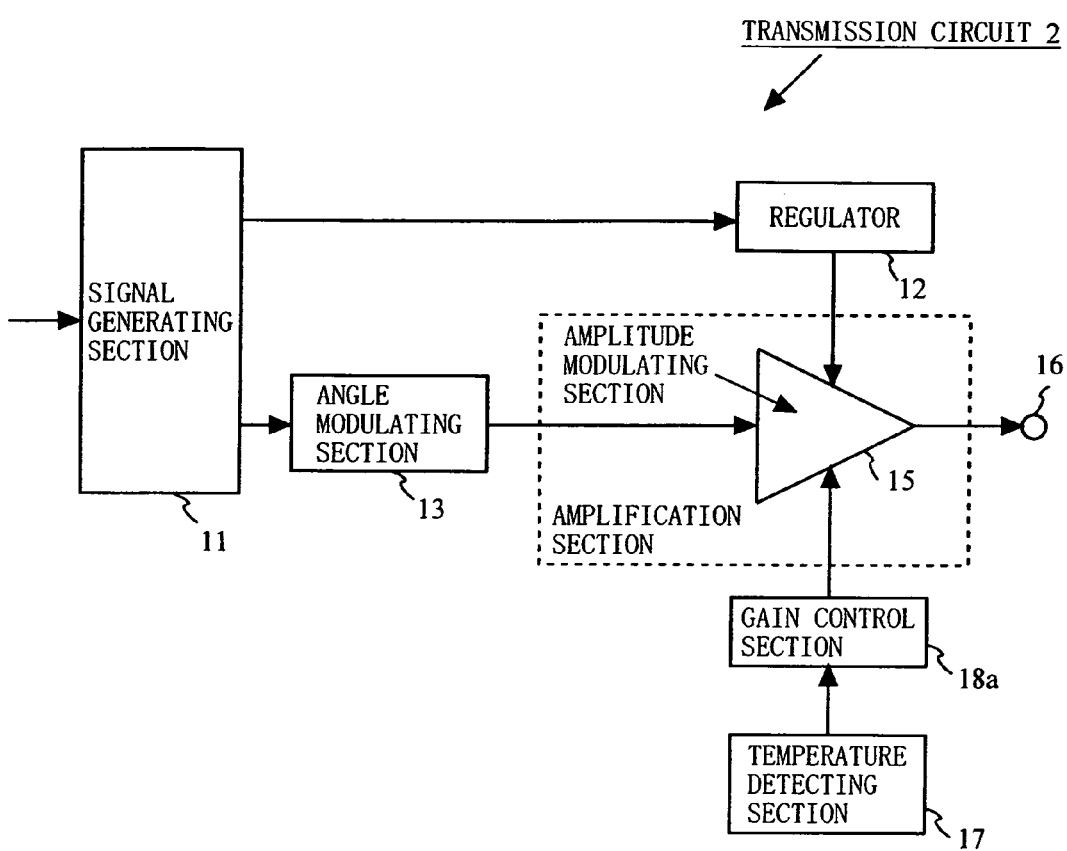
FIG. 11 is a block diagram illustrating an exemplary configuration of a transmission circuit 2 according to a second embodiment of the present invention.

FIG. 11 is a block diagram illustrating an exemplary configuration of a transmission circuit 2 according to a second embodiment of the present invention. In FIG. 11, the transmission circuit 2 comprises a signal generating section 11, a regulator 12, an angle modulating section 13, an amplitude modulating section 15, an output terminal 16, a temperature detecting section 17, and a gain control section 18a. Note that the amplitude modulating section 15 may be simply referred to as an amplification section.

The signal generating section 11 generates an amplitude signal and a phase signal based on input data. The amplitude signal generated in the signal generating section 11 is input to the regulator 12. The regulator 12 outputs a signal depending on a magnitude of the input amplitude signal. Typically, the regulator 12 outputs a signal having a magnitude which is proportional to the magnitude of the amplitude signal. The signal output from the regulator 12 is input to the amplitude modulating section 15. On the other hand, an angle-modulated signal output from the angle modulating section 13 is input to the amplitude modulating section 15. The amplitude modulating section 15 subjects the input angle-modulated signal to amplitude modulation using the signal output from the regulator 12 to output an angle-modulated and amplitude-modulated signal. The modulated signal amplitude-modulated by the amplitude modulating section 15 is output as a transmission signal from the output terminal 16.

The temperature detecting section 17 monitors a temperature of the amplitude modulating section 15 to output temperature information of the amplitude modulating section 15. Note that the temperature detecting section 17 is assumed to be placed in the vicinity of the amplitude modulating section 15 so as to monitor the temperature of the amplitude modulating section 15. The temperature information output from the temperature detecting section 17 is input to the gain control section 18a. The gain control section 18a adjusts a bias voltage which is to be supplied to the amplitude modulating section 15, based on the temperature information of the temperature detecting section 17, thereby controls a gain of the amplitude modulating section 15.

Figure 12A:
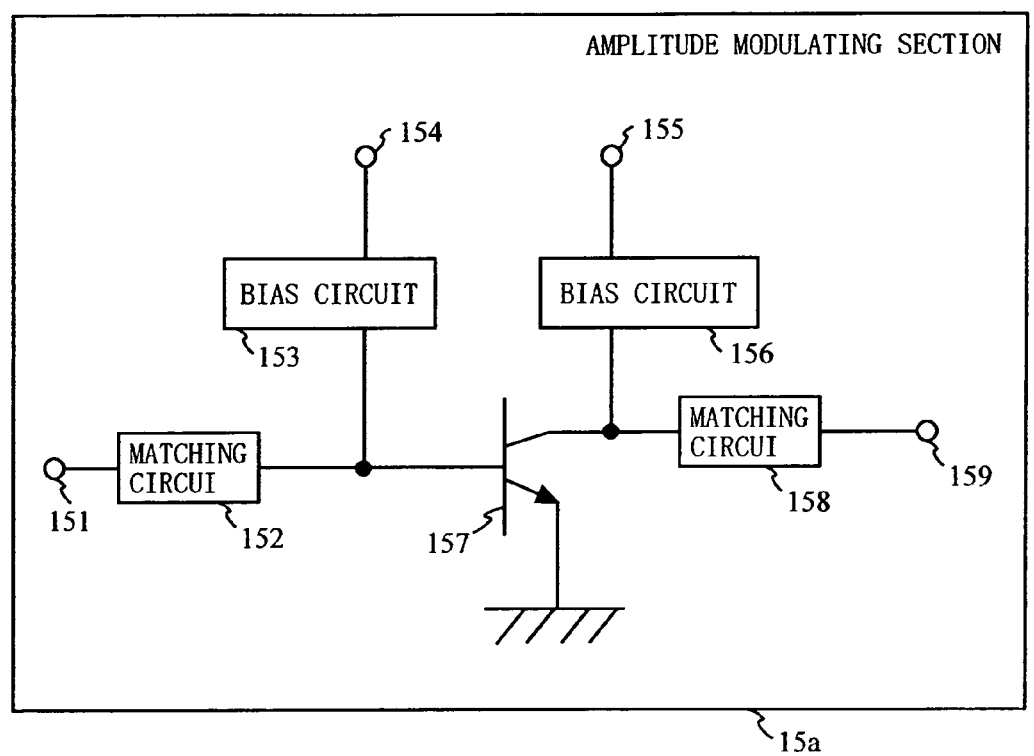

For example, the amplitude modulating section 15 can be configured as an amplitude modulating section 15a illustrated in FIG. 12A. FIG. 12A is a block diagram illustrating an exemplary configuration of the amplitude modulating section 15a. In FIG. 12A, the amplitude modulating section 15a includes an input terminal 151, a matching circuit 152, a bias circuit 153, a power supply terminal 154, an input terminal 155, a bias circuit 156, a transistor 157, a matching circuit 158, and an output terminal 159. Here, the transistor 157 is assumed to be a bipolar transistor. An angle-modulated signal is input from the angle modulating section 13 to the input terminal 151. The angle-modulated signal is input via the matching circuit 152 to a base terminal of the transistor 157.

A direct-current voltage is applied to the power supply terminal 154. Specifically, a bias voltage is supplied via the bias circuit 153 to the base terminal of the transistor 157. A signal depending on the magnitude of the amplitude signal from the regulator 12 is input to the input terminal 155. The signal depending on the magnitude of the amplitude signal is input via the bias circuit 156 to a collector terminal of the transistor 157. The transistor 157 subjects the angle-modulated signal to amplitude modulation using the signal depending on the magnitude of the amplitude signal, to output an angle-modulated and amplitude-modulated signal. The modulated signal output from the transistor 157 is output via the matching circuit 158 from the output terminal 159. Note that the transistor 157 may be a field effect transistor.

Figure 12B:
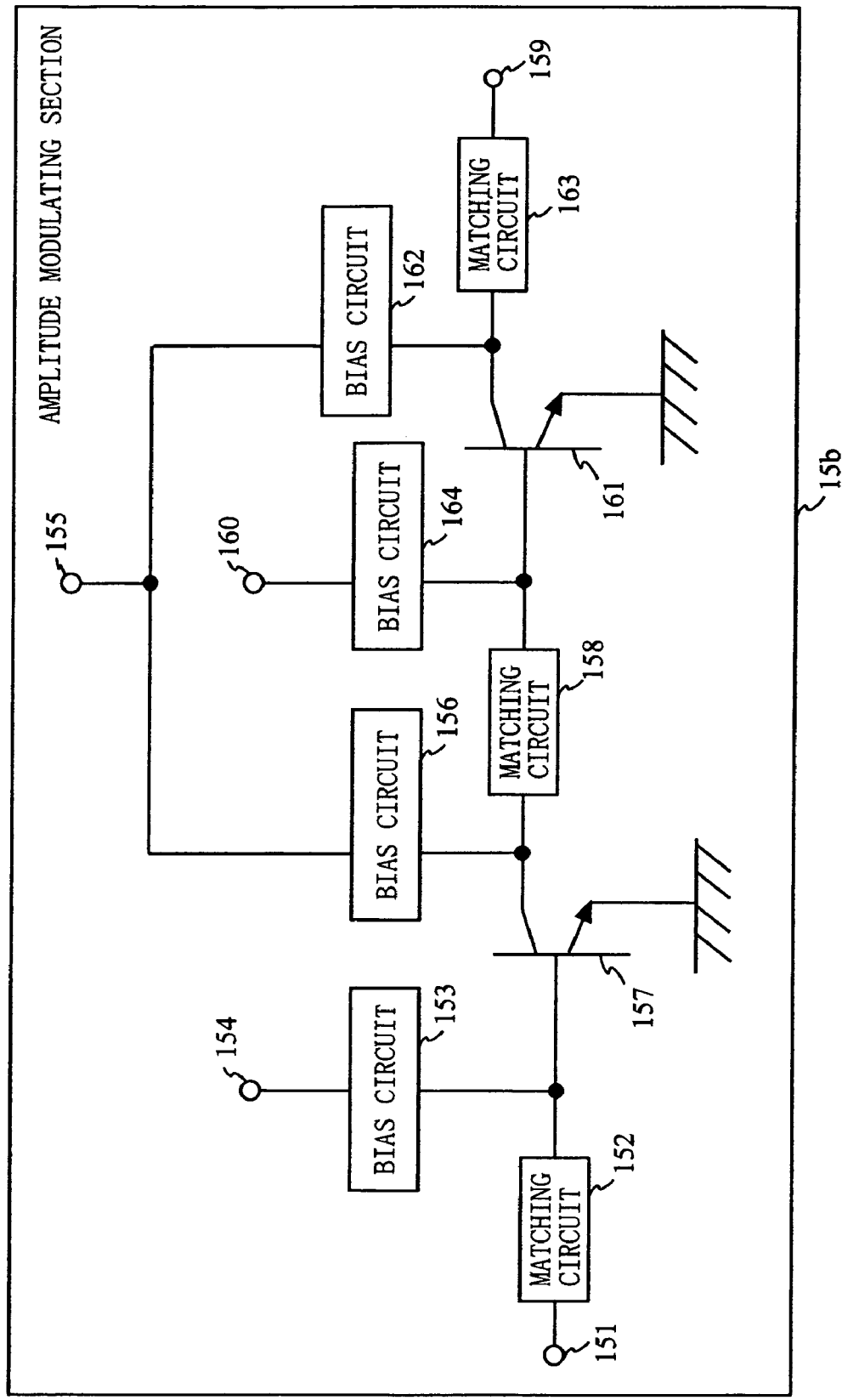
FIG. 12B is a block diagram illustrating an exemplary configuration of an amplitude modulating section 15b.

The amplitude modulating section 15 may have a configuration different from that of the amplitude modulating section 15a. FIG. 12B is a block diagram illustrating an exemplary configuration of an amplitude modulating section 15b. In FIG. 12B, the amplitude modulating section 15b has a basic configuration in which two amplitude modulating sections 15a are connected in series. Here, a transistor 157 and a transistor 161 are assumed to be bipolar transistors. A bias voltage is supplied from the power supply terminal 154 via the bias circuit 153 to a base terminal of the transistor 157. A bias voltage is supplied from a power supply terminal 160 via a bias circuit 164 to a base terminal of the transistor 161.

A signal depending on the magnitude of the amplitude signal from the regulator 12 is input via a power supply terminal 155 and a bias circuit 156 to a collector terminal of the transistor 157. The signal depending on the magnitude of the amplitude signal from the regulator 12 is also input via the power supply terminal 155 and a bias circuit 162 to a collector terminal of the transistor 161. With such a configuration, the amplitude modulating section 15b can output a modulated signal having a wider dynamic range than that of the amplitude modulating section 15a of FIG. 12A. Note that a similar effect is obtained even if the transistor 157 and the transistor 161 are field effect transistors.

Figure 13:
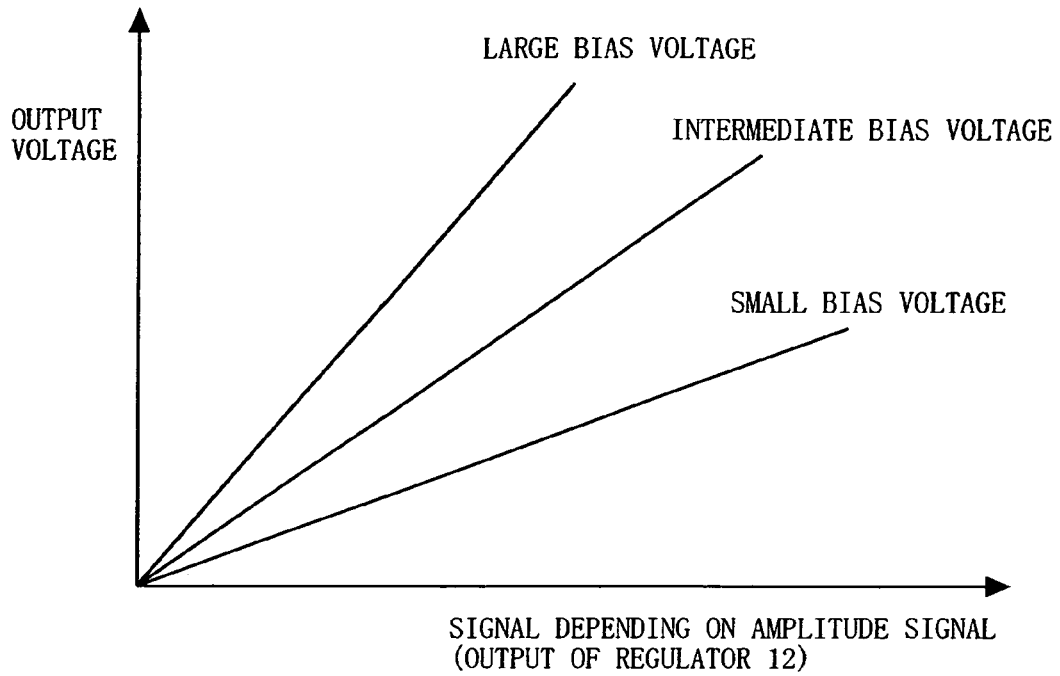
FIG. 13 is a diagram illustrating an example of characteristics of an amplitude modulating section 15 when a bias voltage supplied from a power supply terminal 154 is changed.

The temperature characteristics of the amplitude modulating section 15 are as illustrated in FIG. 2. FIG. 13 is a diagram illustrating an example of the characteristics of the amplitude modulating section 15 when the bias voltage supplied from the power supply terminal 154 is changed. Specifically, FIG. 13 illustrates the characteristics of the amplitude modulating section 15 where the magnitudes of the bias voltages are large, intermediate and small. In FIG. 13, the horizontal axis represents a signal (i.e., the output of the regulator 12) depending on the amplitude signal input from the regulator 12. The vertical axis represents a voltage (i.e., the output voltage of the amplitude modulating section 15) of the modulated signal output from the amplitude modulating section 15. As illustrated in FIG. 13, as the bias voltage supplied to the amplitude modulating section 15 increases, the output voltage of the amplitude modulating section 15 increases.

Figure 14:
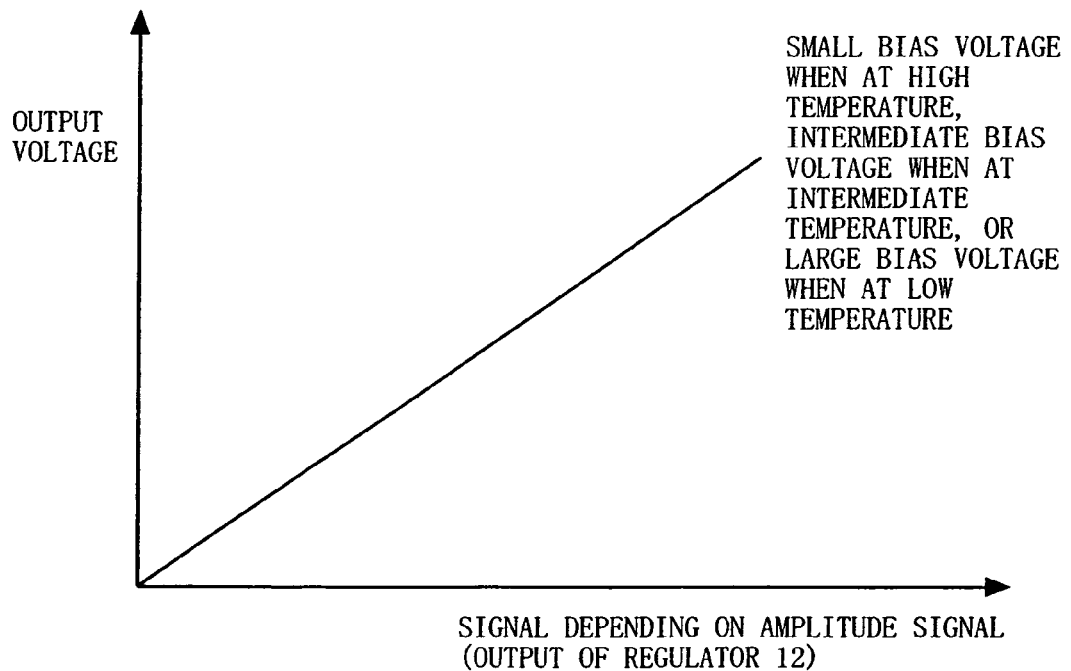
FIG. 14 is a diagram illustrating characteristics of the amplitude modulating section 15 when a bias voltage which is to be supplied is controlled, depending on temperature information.

The transmission circuit 1 causes the characteristics of the amplitude modulating section 15 to be constant by utilizing the characteristics of the amplitude modulating section 15 illustrated in FIGS. 2 and 13. Specifically, in the transmission circuit 2, by reducing the bias voltage which is to be supplied to the amplitude modulating section 15 with an increase in the temperature of the amplitude modulating section 15, the characteristics of the amplitude modulating section 15 are caused to be constant independently of the temperature as illustrated in FIG. 14. Thereby, the transmission circuit 2 can obtain the output of a stable transmission signal independently of the temperature of the amplitude modulating section 15.

As described above, according to the transmission circuit 2 of the second embodiment of the present invention, also by controlling the bias voltage which is to be supplied to the amplitude modulating section 15 based on the temperature of the amplitude modulating section 15, the characteristics of the amplitude modulating section 15 can be caused to be constant independently of the temperature. Thereby, the transmission circuit 2 can also obtain an effect similar to that of the transmission circuit 1 of the first embodiment.

Third Embodiment

Figure 15:
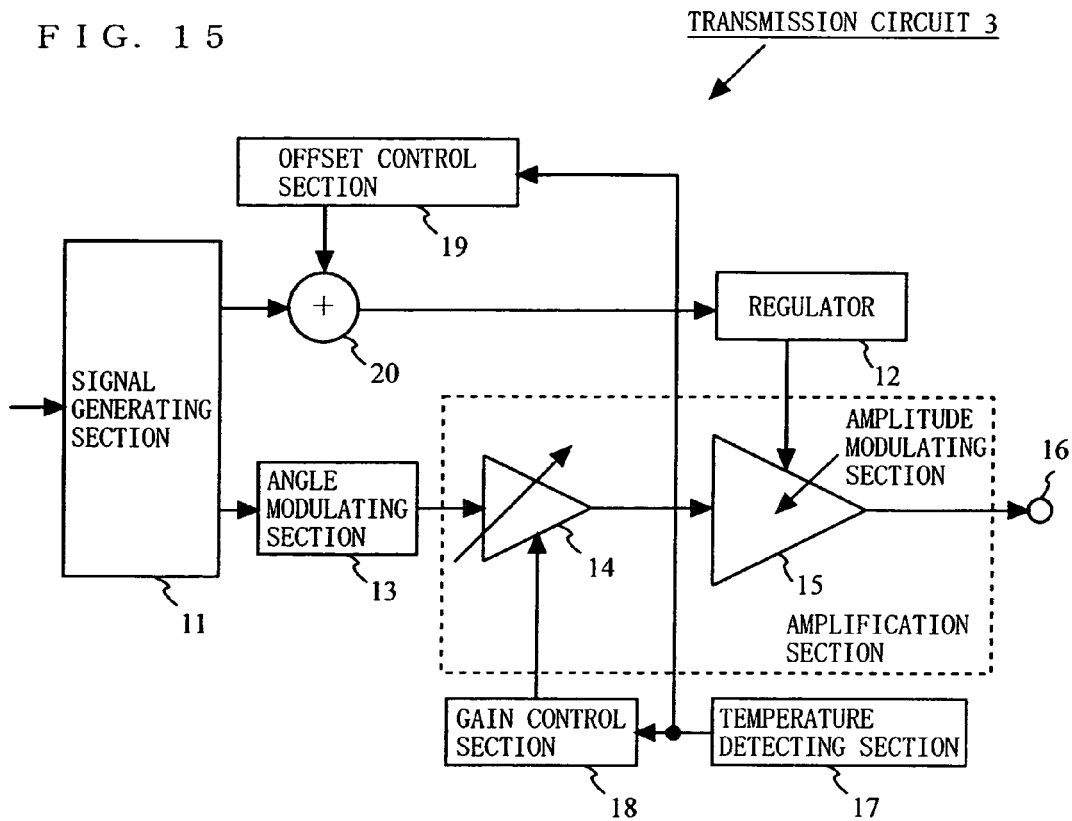
FIG. 15 is a block diagram illustrating an exemplary configuration of a transmission circuit 3 according to a third embodiment of the present invention.

FIG. 15 is a block diagram illustrating an exemplary configuration of a transmission circuit 3 according to a third embodiment of the present invention. In FIG. 15, the transmission circuit 3 is the same as the transmission circuit 1 of the first embodiment, except that the transmission circuit 3 further comprises an offset control section 19 and an offset compensating section 20. The offset control section 19 outputs an AM offset value which is to be added to an amplitude signal, based on the temperature information output from the temperature detecting section 17. The offset compensating section 20 adds the AM offset value output from the offset control section 19 to the amplitude signal.

Figure 16:
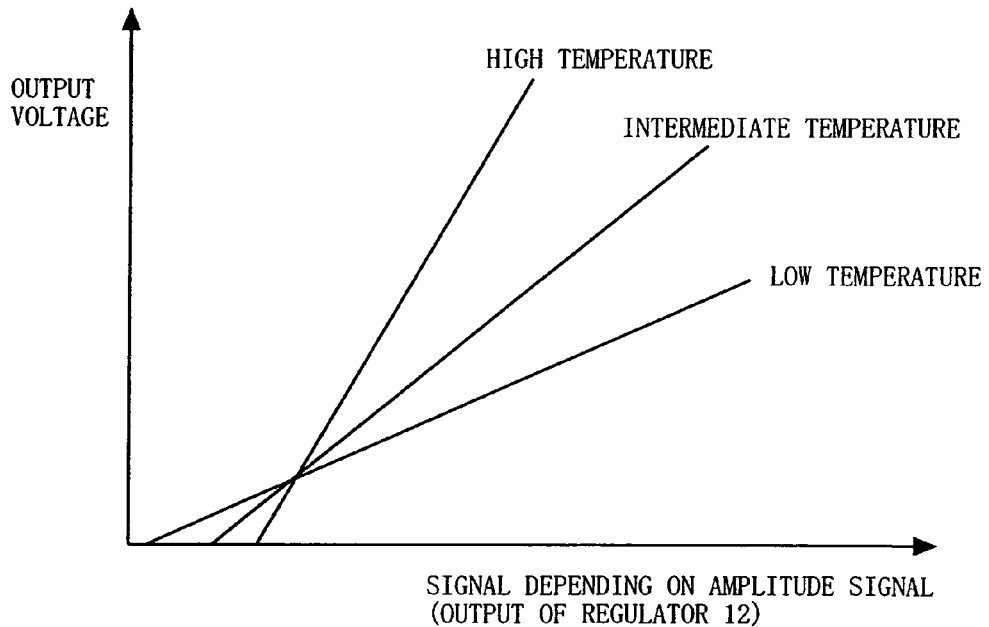
FIG. 16 is a diagram illustrating exemplary characteristics of an amplitude modulating section 15.

FIG. 16 is a diagram illustrating an example of the characteristics of the amplitude modulating section 15. When the amplitude modulating section 15 includes, for example, a Heterojunction Bipolar Transistor (HBT), the amplitude modulating section 15 exhibits characteristics as illustrated in FIG. 16. When the transmission circuit 3 comprises the amplitude modulating section 15 having such characteristics, it is difficult to control a variation in the characteristics due to the temperature of the amplitude modulating section 15 only by controlling the gain of the variable gain amplifier 14. Therefore, the transmission circuit 3 employs the offset control section 19 and the offset compensating section 20 to add to the amplitude signal the AM offset value which is controlled based on the temperature information of the amplitude modulating section 15.

Figure 17:
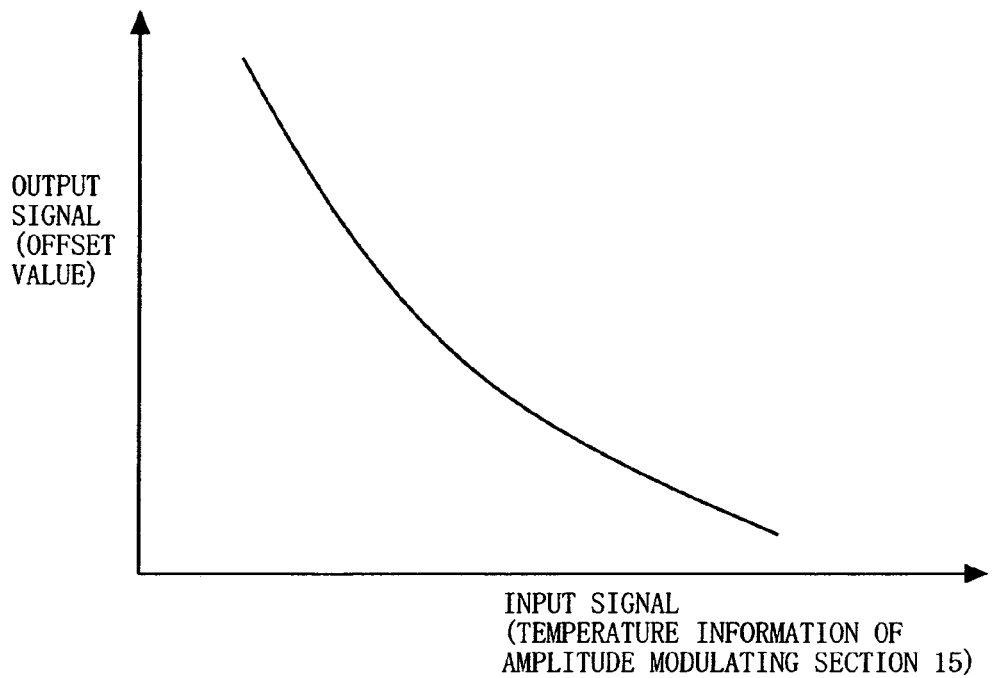
FIG. 17 is a diagram illustrating an example of an AM offset value output by an offset control section 19.

FIG. 17 is a diagram illustrating an example of the AM offset value output by the offset control section 19. As illustrated in FIG. 17, the offset control section 19 outputs a small AM offset value to the amplitude signal when the amplitude modulating section 15 is at high temperature, and a large AM offset value when the amplitude modulating section 15 is at low temperature. Also, the offset control section 19 may output a negative AM offset value when the amplitude modulating section 15 is at high temperature, and a positive AM offset value when the amplitude modulating section 15 is at low temperature.

The offset control section 19 may be composed of an analog circuit as is similar to the gain control section 18, or alternatively, may be composed of a digital circuit including a table in which an optimal AM offset value is previously set. Also, the offset control section 19 may control the AM offset value in real time, depending on the temperature information from the temperature detecting section 17, or may control the AM offset value periodically at slot boundaries, frame boundaries, or the like.

Figure 18:
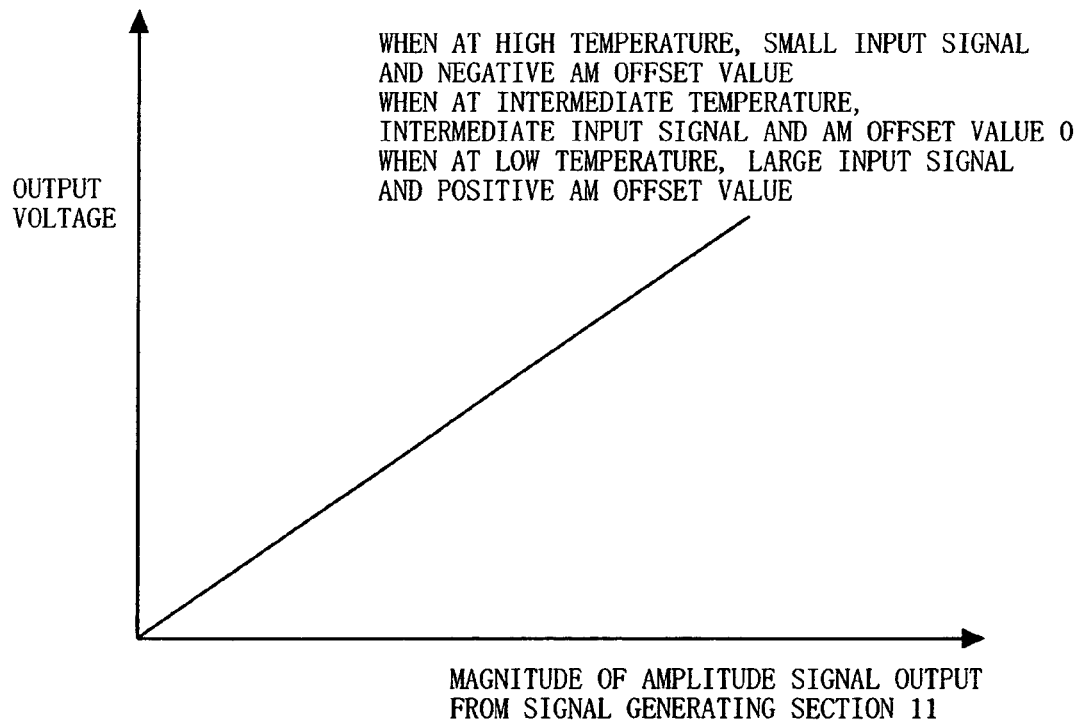
FIG. 18 is a diagram illustrating characteristics of the amplitude modulating section 15 when the AM offset value is controlled, depending on temperature information.

The transmission circuit 3 combines the gain control of the variable gain amplifier 14 and the AM offset control, thereby causing the characteristics of the amplitude modulating section 15 to be constant independently of the temperature as illustrated in FIG. 18, even when the amplitude modulating section 15 has characteristics as illustrated in FIG. 16. Thereby, the transmission circuit 3 can obtain an output of a stable transmission signal independently of the temperature of the amplitude modulating section 15.

Figure 19A:
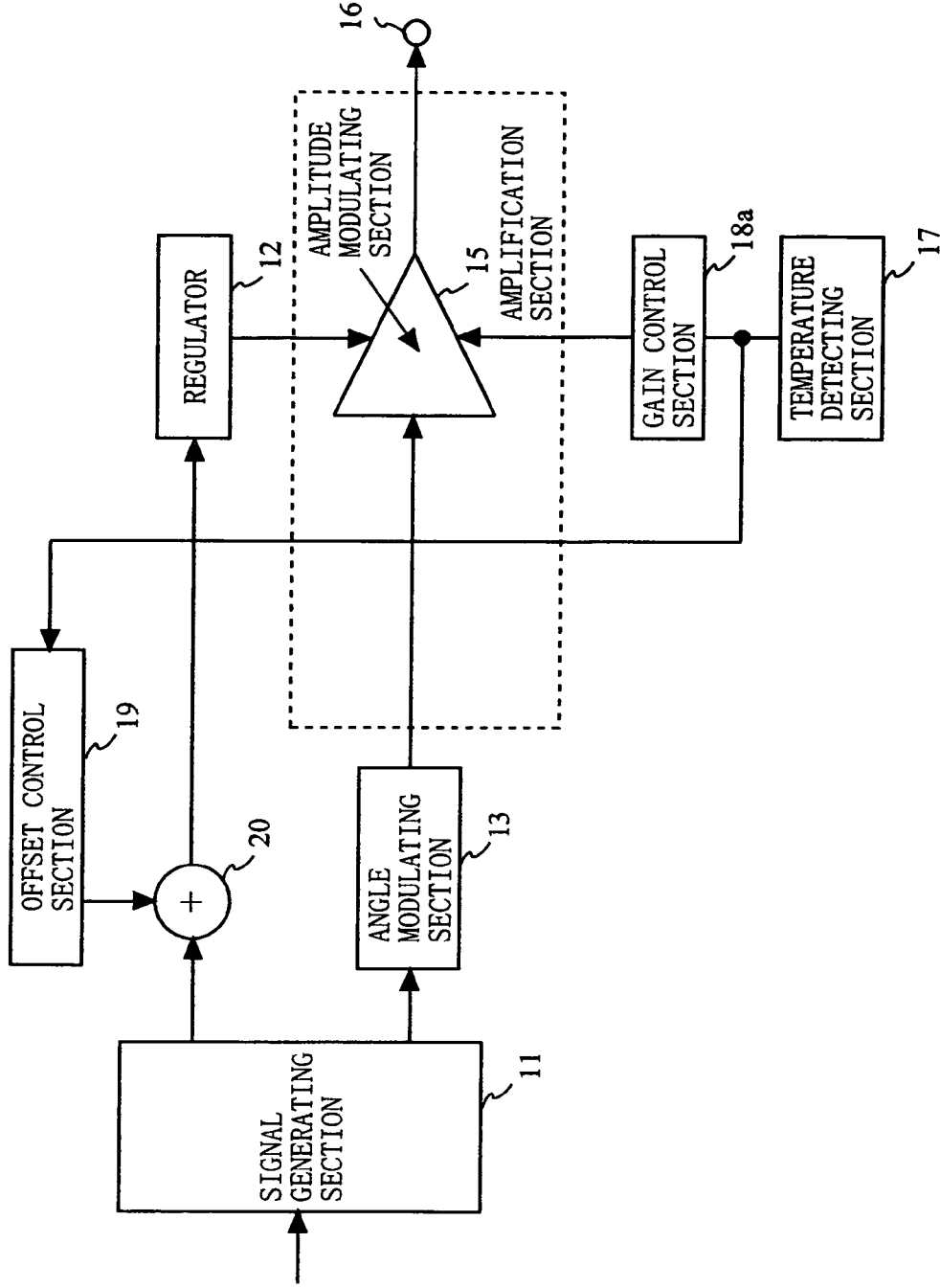
FIG. 19A is a block diagram illustrating an exemplary configuration of the transmission circuit 3a of the third embodiment of the present invention.

Note that the transmission circuit 3 may have a configuration (see a transmission circuit 3a illustrated in FIG. 19A) in which the gain of the amplitude modulating section 15 is controlled by adjusting the bias voltage which is to be supplied to the amplitude modulating section 15 as in the second embodiment, instead of controlling the gain of the angle-modulated signal which is to be input to the amplitude modulating section 15 using the variable gain amplifier 14. The transmission circuit 3a of FIG. 19A can also obtain an effect similar to that of the transmission circuit 3 of FIG. 15.

Figure 19B:
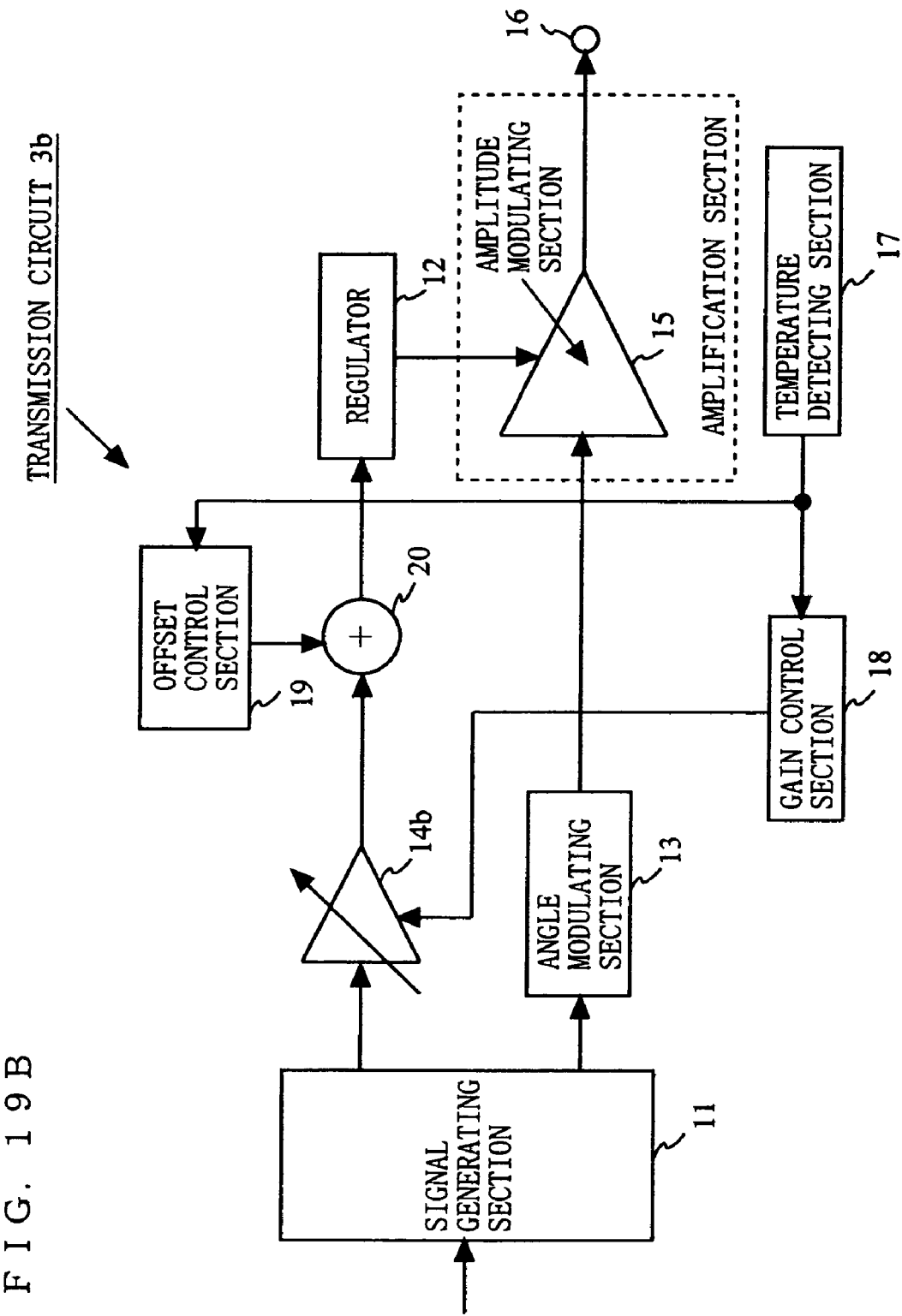
FIG. 19B is a block diagram illustrating an exemplary configuration of a transmission circuit 3b according to the third embodiment of the present invention.

Also, the transmission circuit 3 may have a configuration in which a variable gain amplifier 14b is provided before the regulator 12 (see a transmission circuit 3b illustrated in FIG. 19B). FIG. 19B is a block diagram illustrating an exemplary configuration of the transmission circuit 3b according to the third embodiment of the present invention. In FIG. 19B, the variable gain amplifier 14b amplifies or attenuates an input amplitude signal, depending on the gain controlled by the gain control section 18, and outputs the result. Also in this case, the transmission circuit 3b can obtain an effect similar to that of the transmission circuit 3.

Also, the transmission circuit 3 may have a configuration in which a variable gain amplifier is provided both before the regulator 12 and before the amplitude modulating section 15 (see a transmission circuit 3c illustrated in FIG. 19C). FIG. 19C is a block diagram illustrating an exemplary configuration of the transmission circuit 3c according to the third embodiment of the present invention. In FIG. 19C, a variable gain amplifier 14b amplifies or attenuates an input amplitude signal, depending on the gain controlled by the gain control section 18, and outputs the result. A variable gain amplifier 14c amplifies or attenuates an input angle-modulated signal, depending on the gain controlled by the gain control section 18, and outputs the result. Also in this case, the transmission circuit 3c can obtain an effect similar to that of the transmission circuit 3.

As described above, according to the transmission circuit 3 of the third embodiment of the present invention, by combining the gain control of the variable gain amplifier 14 (or the control of the bias voltage which is to be supplied to the amplitude modulating section 15) and the AM offset control, the characteristics of the amplitude modulating section 15 can be caused to be constant independently of the temperature. Thereby, the transmission circuit 3 can obtain an effect similar to that of the first and second embodiments even when the amplitude modulating section 15 includes an HBT.

Fourth Embodiment

Figure 20B:
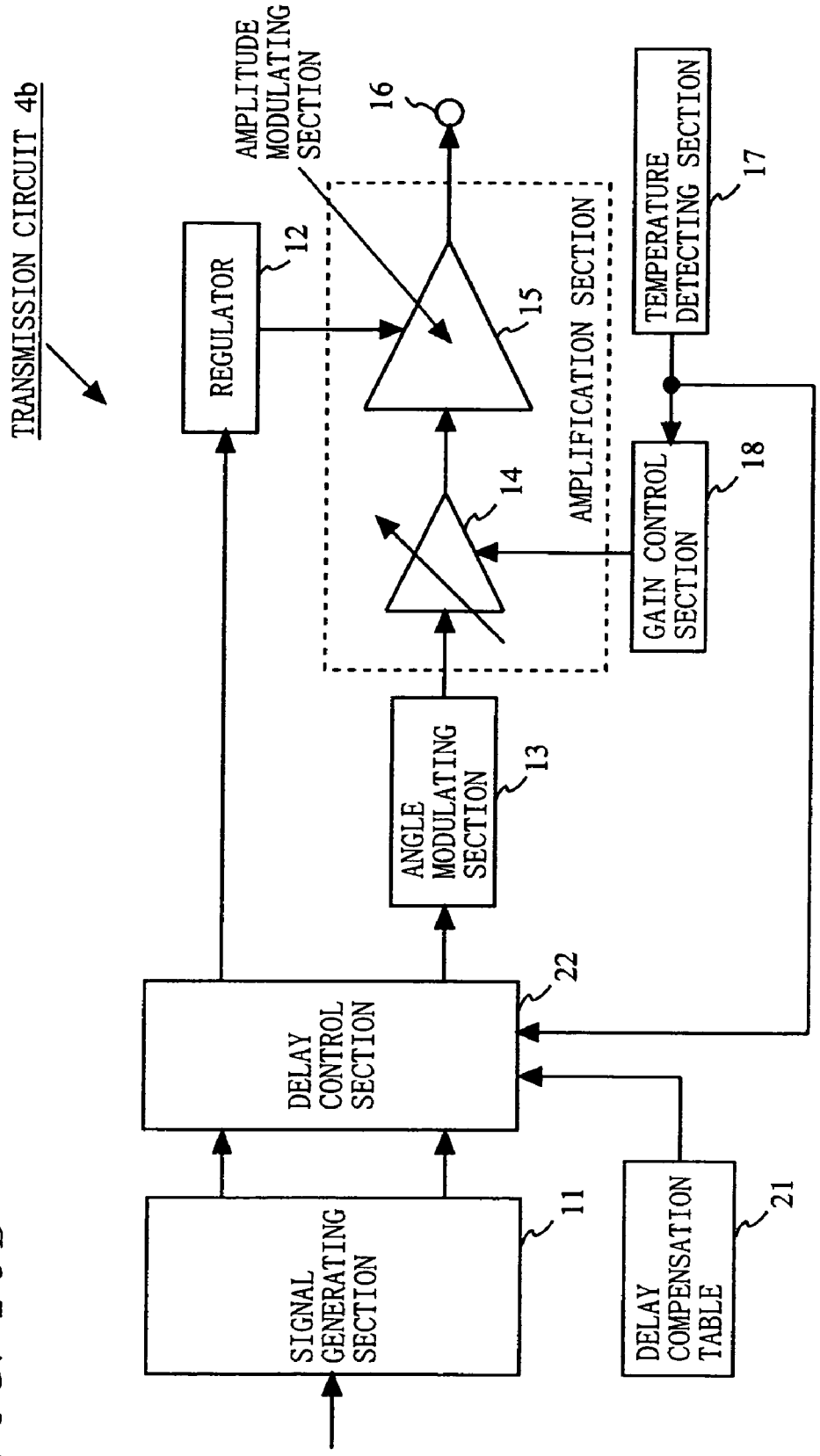
FIG. 20B is a block diagram illustrating an exemplary configuration of a transmission circuit 4b according to the fourth embodiment of the present invention.

FIG. 20A is a block diagram illustrating an exemplary configuration of a transmission circuit 4a according to a fourth embodiment of the present invention. In FIG. 20A, the transmission circuit 4a is the same as the transmission circuits of the first to third embodiments, except that the transmission circuit 4a further comprises a delay compensation table 21 and a delay control section 22. Delay times of an amplitude component and a phase component included in a transmission signal vary, depending on the temperature of the amplitude modulating section 15. Specifically, the delay times of the amplitude component and the phase component included in the transmission signal varies, depending on a change in the gain of the variable gain amplifier 14, the temperature characteristics of the amplitude modulating section 15, or the like. The transmission circuit 4a employs the delay compensation table 21 and the delay control section 22 to perform a control so that the delay times of the amplitude component and the phase component which vary, depending on the temperature characteristics of the amplitude modulating section 15 or the like, become equal to each other. Note that the transmission circuit 4a may have a configuration in which the delay time of at least one of the amplitude signal and the angle-modulated signal output by the signal generating section 11x is adjusted (see a transmission circuit 4b illustrated in FIG. 20B).

FIG. 21 is a diagram illustrating an exemplary delay time set in the delay compensation table 21. In the delay compensation table 21, for example, as illustrated in FIG. 21, a delay time appropriate for at least one of an amplitude signal and a phase signal (or an angle-modulated signal) is set with respect to an input signal from the temperature detecting section 17 (i.e., the temperature information of the amplitude modulating section 15). The delay control section 22 reads out a delay time appropriate for at least one of an amplitude signal and a phase signal (or an angle-modulated signal) from the delay compensation table 21 based on the temperature information of the amplitude modulating section 15. Based on the delay time thus read out, the delay control section 22 adjusts the delay time of at least one of the amplitude signal and the phase signal (or the angle-modulated signal) which are generated by the signal generating section 11.

As described above, according to the transmission circuits 4a and 4b of the fourth embodiment of the present invention, the linearity of a transmission signal can be increased by adjusting the delay time of at least one of an amplitude signal and a phase signal generated by the signal generating section 11, depending on the temperature information of the amplitude modulating section 15.

Figure 22A:
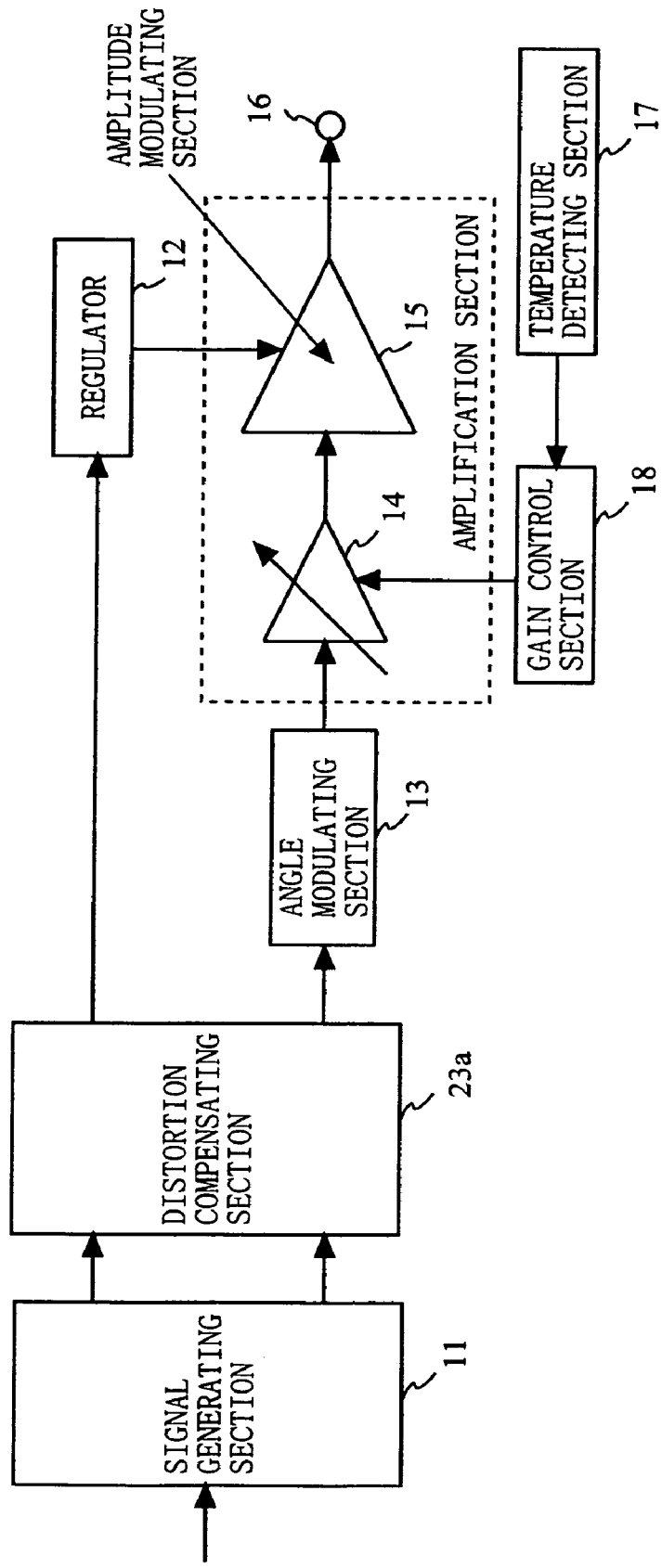

Note that the transmission circuits 1 to 4a and 4b of the first to fourth embodiments may have a configuration in which a predistortion compensating section 23a for compensating for a distortion of at least one of an amplitude signal and a phase signal is provided at an output of the signal generating section 11 so as to compensate for the nonlinearity of the regulator 12 or the amplitude modulating section 15 (see a transmission circuit 5a illustrated in FIG. 22A). FIG. 22A is a block diagram illustrating an exemplary configuration of the transmission circuit 5a comprising the predistortion compensating section 23a. In FIG. 22A, the predistortion compensating section 23a compensates for the amplitude signal and the phase signal generated in the signal generating section 11 so as to suppress a distortion occurring in at least one of the regulator 12 and the amplitude modulating section 15. Also, the transmission circuits 1 to 4a and 4b of the first to fourth embodiments may have a configuration in which a predistortion compensating section 23b for compensating for a distortion of at least one of an amplitude signal and an angle-modulated signal is provided at an output of the signal generating section 11x (see a transmission circuit 5b illustrated in FIG. 22B).

Also, the transmission circuits 1 to 4a and 4b of the first to fourth embodiments can have a configuration in which, since the effect is particularly significant when the output power of a transmission signal (i.e., the output power of the amplitude modulating section 15b) is small, the control depending on the temperature information of the amplitude modulating section 15 is not performed, when the output power of the transmission signal is larger than a predetermined threshold value. Alternatively, the transmission circuits 1 to 4a and 4b may decrease a frequency of the control depending on the temperature information of the amplitude modulating section 15 with an increase in the output power of the transmission signal. Thereby, the transmission circuits 1 to 4a and 4b can perform a control depending on the temperature information so as to match the effect.

Fifth Embodiment

FIG. 23 is a block diagram illustrating an exemplary configuration of a communication apparatus according to a fifth embodiment of the present invention. Referring to FIG. 23, the communication apparatus of the fifth embodiment comprises a transmission circuit 210, a reception circuit 220, an antenna duplexer 230, and an antenna 240. The transmission circuit 210 is the transmission circuit of any of the first to fourth embodiments. The antenna duplexer 230 transfers a transmission signal output from the transmission circuit 210 to the antenna 240, and prevents the transmission signal from leaking to the reception circuit 220. The antenna duplexer 230 also transfers a reception signal input from the antenna 240 to the reception circuit 220, and prevents the reception signal from leaking to the transmission circuit 210. Therefore, the transmission signal is transmitted from the transmission circuit 210, and is emitted via the antenna duplexer 230 from the antenna 240 to the air. The reception signal is received by the antenna 240, and is received via the duplexer 230 by the reception circuit 220. The communication apparatus of the fifth embodiment employs the transmission circuits of the first to fourth embodiments, thereby making it possible to secure the linearity of a transmission signal within a broad temperature range and achieve a low distortion for a radio apparatus. Also, since there is not a branch (e.g., a directional coupler, etc.) at an output of the transmission circuit 210 or the like, loss can be reduced from the transmission circuit to the antenna, so that power consumption during transmission can be reduced. As a result, the communication apparatus can be used for a long period of time as a radio communication apparatus.

The transmission circuit of the present invention can be applied to a communication apparatus or the like for mobile telephony, wireless LAN, or the like.

While the invention has been described in detail, the foregoing description is in all aspects illustrative and not restrictive. It is understood that numerous other modifications and variations can be devised without departing from the scope of the invention.

What is claimed is:

1. A transmission circuit for generating and outputting a transmission signal based on input data, comprising:
   a signal generating section for generating an amplitude signal and an angle-modulated signal by subjecting the input data to signal processing;
   a regulator for outputting a signal depending on a magnitude of the amplitude signal;
   an amplification section for subjecting the angle-modulated signal to amplitude modulation by amplifying the angle-modulated signal, depending on the signal output from the regulator, to output an angle-modulated and amplitude-modulated signal;
   a temperature detecting section for detecting temperature information of the amplification section; and
   a gain control section for controlling a gain of the amplification section, depending on the temperature information detected by the temperature detecting section.

2. The transmission circuit according to claim 1, wherein the amplification section includes:
   a variable gain amplifier for amplifying the angle-modulated signal output from the angle modulating section, depending on the gain controlled by the gain control section; and
   an amplitude modulating section for subjecting the angle-modulated signal to amplitude modulation by amplifying the angle-modulated signal amplified by the variable gain amplifier, depending on the signal output from the regulator, to output the angle-modulated and amplitude-modulated signal,
   wherein the temperature detecting section detects the temperature information of the amplitude modulating section, and the gain control section controls a gain of the variable gain amplifier, depending on the temperature information detected by the temperature detecting section.

3. The transmission circuit according to claim 2, further comprising:
an offset compensating section for adding an offset value to the amplitude signal generated by the signal generating section; and
an offset control section for controlling the offset value which is to be added to the amplitude signal by the offset compensating section, depending on the temperature information of the temperature detecting section.

4. The transmission circuit according to claim 3, wherein the offset control section is composed of an analog circuit.

5. The transmission circuit according to claim 3, wherein the offset control section controls the offset value which is to be added to the amplitude signal by the offset compensating section, based on a table previously setting offset values which are to be added to the amplitude signal, depending on temperature characteristics of the amplitude modulating section.

6. The transmission circuit according to claim 5, wherein the offset control section periodically controls the offset value which is to be added to the amplitude signal by the offset compensating section.

7. The transmission circuit according to claim 3, further comprising:
a second variable gain amplifier connected between the signal generating section and the regulator, for amplifying the amplitude signal output from the signal generating section, depending on the gain controlled by the gain control section,
wherein the gain control section controls gains of the variable gain amplifier and the second variable gain amplifier, depending on the temperature information detected by the temperature detecting section.

8. The transmission circuit according to claim 2, further comprising:
a second variable gain amplifier connected between the signal generating section and the regulator, for amplifying the amplitude signal output from the signal generating section, depending on the gain controlled by the gain control section,
wherein the gain control section controls gains of the variable gain amplifier and the second variable gain amplifier, depending on the temperature information detected by the temperature detecting section.

9. The transmission circuit according to claim 1, wherein the amplification section includes an amplitude modulating section for subjecting the angle-modulated signal to amplitude modulation by amplifying the angle-modulated signal, depending on the signal output by the regulator, to output the angle-modulated and amplitude-modulated signal,
the temperature detecting section detects the temperature information of the amplitude modulating section, and
the gain control section controls a bias voltage which is to be supplied to the amplitude modulating section, depending on the temperature information detected by the temperature detecting section.

10. The transmission circuit according to claim 9, further comprising:
an offset compensating section for adding an offset value to the amplitude signal generated by the signal generating section; and
an offset control section for controlling the offset value which is to be added to the amplitude signal by the offset compensating section, depending on the temperature information of the temperature detecting section.

11. The transmission circuit according to claim 1, wherein the gain control section is composed of an analog circuit.

12. The transmission circuit according to claim 1, wherein the gain control section controls the gain of the amplification section based on a table previously setting gains for controlling the amplification section, depending on temperature characteristics of the amplification section.

13. The transmission circuit according to claim 12, wherein the gain control section periodically controls the gain of the amplification section.

14. The transmission circuit according to claim 1, further comprising:
a predistortion compensating section provided at an output of the signal generating section.

15. The transmission circuit according to claim 1, wherein the regulator is a switching regulator.

16. The transmission circuit according to claim 1, wherein the regulator is a series regulator.

17. The transmission circuit according to claim 1, wherein the regulator has a configuration in which a switching regulator and a series regulator are connected in series.

18. The transmission circuit according to claim 1, wherein the temperature detecting section is mounted on the same chip on which a transistor included in the amplification section is mounted.

19. The transmission circuit according to claim 1, wherein the temperature detecting section is mounted in the same module in which a transistor included in the amplification section is mounted.

20. The transmission circuit according to claim 1, wherein the temperature detecting section is mounted on a substrate in a vicinity of the amplification section.

21. The transmission circuit according to claim 1, wherein the signal generating section includes:
a polar-coordinate signal generating section for generating the amplitude signal and the phase signal based on an amplitude component and a phase component obtained by subjecting the input data to signal processing; and
an angle modulating section for subjecting the phase signal to angle modulation to output the angle-modulated signal.

22. The transmission circuit according to claim 1, wherein the signal generating section includes:
a quadrature signal generating section for subjecting the input data to signal processing to generate a vector signal composed of an I signal and a Q signal orthogonal to each other;
a vector modulating section for subjecting the vector signal to vector modulation;
an envelope detecting section for detecting an envelope component of a signal output from the vector modulating section, and outputting the detected envelope component as the amplitude signal; and
a limiter for limiting the envelope component of the signal output from the vector modulating section to a predetermined magnitude, and outputting the magnitude-limited signal as the angle-modulated signal.

23. The transmission circuit according to claim 1, further comprising:
a delay control section connected after the signal generating section, for adjusting timing of at least of the amplitude signal and the angle-modulated signal, depending on the temperature information detected by the temperature detecting section, so as to cause delay times of an amplitude component and a phase component included in the modulated signal to be equal to each other.

24. The transmission circuit according to claim 23, further comprising:
a delay compensation table previously setting a delay time optimal to a control of at least one of the amplitude signal and the angle-modulated signal,
wherein the delay control section reads out the delay time of at least one of the amplitude signal and the angle-modulated signal from the delay compensation table, depending on the temperature information detected by the temperature detecting section, and based on the read delay time, adjusts timing of outputting at least one of the amplitude signal and the angle-modulated signal.

25. A communication apparatus comprising:
a transmission circuit for generating a transmission signal; and
an antenna for outputting the transmission signal generated in the transmission circuit,
wherein the transmission circuit is the transmission circuit according to claim 1.

26. The communication apparatus according to claim 25, further comprising:
a reception circuit for processing a reception signal received from the antenna; and
an antenna duplexer for outputting the transmission signal generated in the transmission circuit to the antenna, and outputting the reception signal received from the antenna to the reception circuit.

27. A transmission circuit for generating and outputting a transmission signal based on input data, comprising:
a signal generating section for generating an amplitude signal and an angle-modulated signal by subjecting the input data to signal processing;
a variable gain amplifier for amplifying the amplitude signal using a controlled gain;
a regulator for outputting a signal depending on a magnitude of the amplitude signal amplified by the variable gain amplifier;
an amplification section for subjecting the angle-modulated signal to amplitude modulation by amplifying the angle-modulated signal, depending on the signal output from the regulator, to output an angle-modulated and amplitude-modulated signal;
a temperature detecting section for detecting temperature information of the amplification section; and
a gain control section for controlling a gain of the variable gain amplifier, depending on the temperature information detected by the temperature detecting section.

28. The transmission circuit according to claim 27, further comprising:
an offset compensating section connected between the variable gain amplifier and the regulator, for adding an offset value to the amplitude signal amplified in the variable gain amplifier; and
an offset control section for controlling the offset value which is to be added to the amplitude signal by the offset compensating section, depending on the temperature information detected by the temperature detecting section.

* * * * *